US012710945B2

(12) United States Patent
Le et al.

(10) Patent No.: US 12,710,945 B2
(45) Date of Patent: Aug. 18, 2026

(54) CROSS-PLATFORM CODE CONVERSION METHOD AND DEVICE

(71) Applicant: HUAWEI TECHNOLOGIES CO., LTD., Shenzhen (CN)

(72) Inventors: Yongnian Le, Shanghai (CN); Bo Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 204 days.

(21) Appl. No.: 18/045,454

(22) Filed: Oct. 10, 2022

(65) Prior Publication Data

US 2023/0113783 A1 Apr. 13, 2023

Related U.S. Application Data

(63) Continuation of application No. PCT/CN2021/086692, filed on Apr. 12, 2021.

(30) Foreign Application Priority Data

Apr. 14, 2020 (CN) ......................... 202010292191.9
May 19, 2020 (CN) ......................... 202010426740.7

(51) Int. Cl.
*G06F 8/51* (2018.01)
*G06F 8/41* (2018.01)

(52) U.S. Cl.
CPC . *G06F 8/51* (2013.01); *G06F 8/42* (2013.01)

(58) Field of Classification Search
CPC ..... G06F 8/51; G06F 8/42; G06F 8/75; G06F 8/76

(Continued)

(56) References Cited

U.S. PATENT DOCUMENTS 6,477,683 B1 * 11/2002 Killian .................... G06F 30/30 716/139
10,802,825 B2 * 10/2020 Guan ...................... G06F 8/433
(Continued)

FOREIGN PATENT DOCUMENTS

CN 104391730 A 3/2015
CN 110471666 A 11/2019

OTHER PUBLICATIONS

Tamarit Salvador, Vigueras Guillermo, Carro Manuel, Marino Julio: "A haskell implementation of a rulebased program transformation for C programs" In: "PADL 2015: Practical Aspects of Declarative Languages", Jun. 18, 2015 (Jun. 18, 2015), Springer International Publishing, XP047644879, Total 10 Pages.

(Continued)

*Primary Examiner* — Matthew J Brophy

(57) ABSTRACT

In a cross-platform code conversion method, a conversion device obtains first source code that is configured to run on a first platform. The conversion device performs syntactic analysis on the first source code to generate a syntax tree corresponding to the first source code, and identifies a to-be-converted syntax block in the syntax tree according to a syntax rule provided by a rule library. The conversion device converts the to-be-converted syntax block according to a conversion rule provided by the rule library to obtain a converted syntax block. The conversion device then generates, based on the obtained converted syntax block, second source code for running on a second platform.

18 Claims, 13 Drawing Sheets

(58) Field of Classification Search
USPC .......................................................... 717/137
See application file for complete search history.

(56) References Cited

U.S. PATENT DOCUMENTS 10,846,083 B2 * 11/2020 Hu ............................ G06F 8/76
11,061,652 B1 * 7/2021 Biswas ................... G06F 8/427
2003/0167458 A1 * 9/2003 Santhanam ............... G06F 8/41 717/136
2003/0208723 A1 * 11/2003 Killian .................... G06F 30/30 716/102
2008/0244471 A1 * 10/2008 Killian ...................... G06F 8/41 716/100
2014/0282444 A1 * 9/2014 Araya ....................... G06F 8/42 717/143
2015/0154011 A1 * 6/2015 Ceng ......................... G06F 8/51 717/137
2016/0048417 A1 * 2/2016 Gschwind ............... G06F 7/768 719/320
2016/0179486 A1 6/2016 Sheth
2019/0034178 A1 * 1/2019 Goetz ....................... G06F 8/52
2020/0192662 A1 * 6/2020 Hu ............................ G06F 8/76
2020/0210159 A1 * 7/2020 Bouchard ................. G06F 8/51
2020/0272458 A1 * 8/2020 Guan ...................... G06F 8/425
2022/0357934 A1 * 11/2022 Ling ....................... G06F 8/425
2023/0093197 A1 * 3/2023 Graham .................... G06F 8/53 717/140
2023/0113783 A1 * 4/2023 Le ............................. G06F 8/51 717/137

OTHER PUBLICATIONS

Salvador Tamarit et al: "Towards a Semantics-Aware Code Transforamtion Toolchain for Heterogeneous Systems", arxiv.org, Cornell University Library, 201 OLIN Library Cornell University Ithaca, NY 14853, Jan. 12, 2017, (Jan. 12, 2017), XP080741106, Total 18 Pages.
Lisa, How to achieve 90% automatic migration of C/C++ code from x86 to Kunpeng platform? [online], https://www.infoq.cn/article/bi4gqhnc7wtzk8udntmj, Mar. 28, 2020, total 14 pages.

* cited by examiner

Migration detection and evaluation tool

Script language string matching

402

Accumulation/ Reuse

401

Migration guide manual

Search and detection

Manual migration

400

Modified source file

403

CROSS-PLATFORM CODE CONVERSION METHOD AND DEVICE

CROSS-REFERENCE TO RELATED APPLICATIONS

This application is a continuation of International Patent Application No. PCT/CN2021/086692, filed on Apr. 12, 2021, which claims priority to Chinese Patent Application No. 202010292191.9, filed on Apr. 14, 2020, and Chinese Patent Application No. 202010426740.7, filed on May 19, 2020. All of the aforementioned priority patent applications are hereby incorporated by reference in their entirety.

TECHNICAL FIELD

This application relates to the field of computer technologies, and in particular, to a cross-platform code conversion method and device.

BACKGROUND

In the field of computer software technologies, a developer compiles source code of application software by using a high-level programming language such as C or C++, so that the application software can successfully run on a computing platform (that is, an execution environment of computer software, for example, a Wintel architecture, an ARM architecture, or an x86 architecture). With rapid development of computer technologies, hardware of many computing platforms having a same instruction set architecture is continuously upgraded, and consequently initially written source code cannot be directly used on a new-version computing platform (for example, the source code is migrated from a computing platform having an ARMv7 instruction set architecture to a computing platform having an ARMv8 instruction set architecture). In addition, when the software developer wants to migrate the application software to computing platforms that use different instruction set architectures (ISA) (for example, migrate the source code from a computing platform using the x86 instruction set architecture to the computing platform using the ARMv8 instruction set architecture), the software developer also needs to modify and convert the source code that is initially developed to run on a computing platform A, so that the application software can successfully run on another computing platform B.

In the conventional technology, some developers manually convert source code by using an auxiliary tool, to implement software migration. Because there is a large amount of source code, a large migration engineering team is usually required to review the source code, find a part that needs to be modified, and make a manual modification. Such a migration method occupies a large quantity of human resources. Even if a tool can help scan a source file to locate a code block that needs to be modified, accuracy cannot be ensured.

Therefore, to improve code conversion accuracy and implement efficient software migration, a method and device for automatically locating and converting a to-be-modified part in source code are required.

SUMMARY

This application provides a cross-platform code conversion method and device, to convert source code that can run on a first platform into source code that can run on a second platform.

According to a first aspect, this application provides a cross-platform code conversion method. The method is performed by a code conversion device, and includes: obtaining first source code that can run on a first platform; performing syntactic analysis on the first source code to generate a syntax tree corresponding to the source code; identifying a to-be-converted syntax block in the syntax tree according to a syntax rule provided by a rule library; converting the to-be-converted syntax block according to a conversion rule provided by the rule library; and finally generating second source code (converted source code) that can run on a second platform. In the foregoing method, "cross-platform" means that source code is migrated from a source platform (the first platform) to another different target platform (the second platform), and the two platforms may use different versions of a same instruction set architecture, or may use different instruction set architectures. In the foregoing method, the to-be-converted syntax block is located through syntactic analysis, and then the identified to-be-converted syntax block is converted according to the conversion rule provided by the rule library. This greatly improves code conversion efficiency. It should be noted that, in the foregoing code conversion method, a syntax block that needs to be modified is mainly identified by using the syntax rule and then the syntax block is modified, and original content of a syntax block that does not need to be modified may be retained. The foregoing method is performed by the code conversion device, and can directly help a user implement automatic code conversion based on guidance of the rule library without participation of another user, thereby ensuring user information security.

In a possible implementation, the converting the at least one to-be-converted syntax block according to a conversion rule provided by the rule library, to obtain at least one converted syntax block includes: for each to-be-converted syntax block, analyzing the to-be-converted syntax block to obtain a semantic condition of the to-be-converted syntax block; and selecting a matched conversion rule from the rule library based on the semantic condition, and modifying the to-be-converted syntax block, to obtain a converted syntax block. In the foregoing method, semantic analysis is performed on the to-be-converted syntax block, and then the matched conversion rule is automatically identified for conversion. This improves code conversion efficiency.

In a possible implementation, the to-be-converted syntax block in the syntax tree of the first source code includes at least one of a built-in function syntax block, an inline assembly code syntax block, and an intrinsic header file syntax block. For example, when the source platform and the target platform use different versions of a same instruction set architecture, the intrinsic header file syntax block may not need to be modified.

In another possible implementation, the rule library provides three groups of rules respectively for the foregoing three types of syntax blocks. The first group of rules are a built-in function syntax rule and a built-in function conversion rule. The built-in function syntax rule can be used to identify a built-in function syntax block that needs to be modified. The built-in function conversion rule is used to convert the identified built-in function syntax block. The second group of rules are an inline assembly code syntax rule and an inline assembly code conversion rule. The inline assembly code syntax rule can be used to identify an inline assembly code syntax block that needs to be modified. The inline assembly code conversion rule is used to convert the identified inline assembly code syntax block. The third group of rules are an intrinsic header file syntax rule and an intrinsic header file conversion rule. The intrinsic header file syntax rule can be used to locate an intrinsic header file syntax block. The intrinsic header file conversion rule is used to convert the identified intrinsic header file syntax block. When the source platform and target platform use different instruction set architectures, the rule library needs to include at least the three groups of rules, and another rule needs to be supplemented based on a distinct feature between the source platform and target platform. It should be noted that rule libraries used in all code conversions are not necessarily completely the same, and are mainly determined by features of the source platform and the target platform jointly. When the source platform and the target platform use different versions of a same instruction set architecture, for example, an intrinsic header file may not be modified, the rule library may include only the first group of rules and the second group of rules.

In the foregoing method, the rule library is a specific embodiment of code conversion experience, and is used to guide a code conversion tool to perform code conversion. In addition, the rule library may be released independently of the code conversion device. The code conversion experience is extracted and recorded by using the rule library, and subsequently the user or personnel who develops the code conversion device may iteratively update the code conversion experience, so that the code conversion (migration) experience can be systematically accumulated, and code conversion efficiency can be continuously improved. It should be noted that the rule library is not a general rule library, and content of the rule library is mainly determined by features of two computing platforms jointly. In addition, the rule library may be a unidirectional migration rule library (for example, used to guide code migration from a platform A to a platform B), or may be a bidirectional migration rule library (for example, used to guide code migration from the platform A to the platform B and code migration from the platform B to the platform A).

In another possible implementation, the built-in function syntax rule specifies a syntax structure of the built-in function syntax block that needs to be modified, a name of a built-in function corresponding to the syntax block, and a first attribute, and the first attribute is used to indicate that the built-in function is called by a user file. The identifying a to-be-converted syntax block in the syntax tree of the first source code according to a syntax rule provided by a rule library, and selecting, from the rule library based on the semantic condition of the to-be-converted syntax block, a conversion rule that matches the semantic condition of the to-be-converted syntax block, and modifying the to-be-converted syntax block, to obtain a converted syntax block includes: identifying the built-in function syntax block based on the syntax structure of the built-in function syntax block, the name of the built-in function corresponding to the syntax block, and the first attribute; and selecting, from the rule library based on a semantic condition of the built-in function syntax block, a built-in function conversion rule that matches the semantic condition of the built-in function syntax block, and modifying the built-in function syntax block, to obtain a converted syntax block. In the foregoing method, the code conversion device identifies and converts the built-in function syntax block under guidance of the rule library, to ensure that the built-in function syntax block of the first source code is successfully rewritten.

In another possible implementation, the inline assembly code syntax rule specifies a syntax structure of the inline assembly code syntax block that needs to be modified and a second attribute of inline assembly code corresponding to the syntax block, and the second attribute is used to indicate that the inline assembly code is written in the user file. The identifying a to-be-converted syntax block in the syntax tree of the first source code according to a syntax rule provided by a rule library, and selecting, from the rule library based on the semantic condition of the to-be-converted syntax block, a conversion rule that matches the semantic condition of the to-be-converted syntax block, and modifying the to-be-converted syntax block, to obtain a converted syntax block includes: identifying the inline assembly code syntax block based on the syntax structure of the inline assembly code syntax block and the second attribute of the inline assembly code corresponding to the syntax block; and selecting, from the rule library based on a semantic condition of the inline assembly code syntax block, an inline assembly code conversion rule that matches the semantic condition of the inline assembly code syntax block, and modifying the inline assembly code syntax block, to obtain a converted syntax block. In the foregoing method, the code conversion device identifies and converts the inline assembly code syntax block under guidance of the rule library, to ensure that the inline assembly code syntax block of the first source code is successfully rewritten.

In another possible implementation, the intrinsic header file syntax rule specifies a syntax structure of the intrinsic header file syntax block that needs to be modified. The identifying a to-be-converted syntax block in the syntax tree of the first source code according to a syntax rule provided by a rule library, and selecting, from the rule library based on the semantic condition of the to-be-converted syntax block, a conversion rule that matches the semantic condition of the to-be-converted syntax block, and modifying the to-be-converted syntax block, to obtain a converted syntax block includes: identifying the intrinsic header file syntax block based on the syntax structure of the intrinsic header file syntax block that needs to be modified; and selecting, from the rule library based on a semantic condition of the intrinsic header file syntax block, an intrinsic header file conversion rule that matches the semantic condition of the intrinsic header file syntax block, and modifying the intrinsic header file syntax block, to obtain a converted syntax block. In the foregoing method, the code conversion device identifies and converts the intrinsic header file syntax block under guidance of the rule library, to ensure that the intrinsic header file syntax block of the first source code is successfully rewritten.

In another possible implementation, the rule library further provides a group of association rules for the built-in function syntax block to search for an associated syntax block and convert the associated syntax block. The association rules include a built-in function association rule and a built-in function association conversion rule corresponding to the built-in function association rule. The built-in function association rule is used to search for a built-in function association syntax block associated with the built-in function syntax block, and the built-in function association conversion rule is used to convert the built-in function association syntax block. When the to-be-converted syntax block is the built-in function syntax block, the method further includes: determining the built-in function association syntax block according to the built-in function association rule provided by the rule library, where the built-in function association syntax block is a declaration or a definition of the built-in function; and selecting, from the rule library based on a semantic condition of the built-in function association syntax block, a built-in function association conversion rule that matches the semantic condition of the built-in function association syntax block, and modifying the built-in function association syntax block, to obtain a converted syntax block. For example, when the first source code is migrated from the first platform to the second platform that uses a different instruction set architecture, a hardware environment changes. If only the built-in function syntax block is modified, the second platform is likely to fail to identify the function. Therefore, a built-in function header file needs to be inserted before the definition (the built-in function association syntax block) of the function, so that modified code can successfully run on the target platform.

In another possible implementation, the rule library further provides a group of association rules for the inline assembly code syntax block to search for an associated syntax block and convert the associated syntax block. The association rules include an inline assembly code association rule and an inline assembly code association conversion rule. The inline assembly code association rule is used to search for an inline assembly code association syntax block associated with the inline assembly code syntax block, and the inline assembly code association conversion rule is used to convert the inline assembly code association syntax block. When the to-be-converted syntax block is the inline assembly code syntax block, the method further includes: determining the inline assembly code association syntax block according to the inline assembly code association rule provided by the rule library, where the inline assembly code association syntax block is a definition of a variable or a declaration of a function in the inline assembly code; and selecting, from the rule library based on a semantic condition of the inline assembly code association syntax block, an inline assembly code association conversion rule that matches the semantic condition of the inline assembly code association syntax block, and modifying the inline assembly code association syntax block, to obtain a converted syntax block. In the foregoing method, the syntax block associated with the inline assembly code syntax block is adaptively modified, to ensure that the second source code can successfully run on the second platform.

In another possible implementation, before generating the second source code that can run on the second platform, the method further includes: generating a semi-structured result file based on the to-be-converted syntax block and the converted syntax block, where the semi-structured result file includes a location of the to-be-converted syntax block in the first source code and source code corresponding to the converted syntax block. The semi-structured result file records modified information and modified code, and is an intermediate product of an entire code conversion process.

In another possible implementation, the method further includes: receiving a modification made by a user to the semi-structured file; and generating, based on a semi-structured result file obtained after the modification, the second source code that can run on the second platform. According to the foregoing method, the user can participate in code conversion, review or modify a code conversion result, and even perform secondary development based on this. This improves user participation and enables the user to better accept the code conversion result.

According to the code conversion method provided in this application, a to-be-converted code block in source code can be automatically identified and modified under guidance of a rule library without consuming extra manpower, so that information security of the source code is also protected. In addition, compared with an existing string matching technology, a conversion method combining "syntax" and "semantics" improves code conversion efficiency and accuracy.

According to a second aspect, this application provides a cross-platform code conversion apparatus. The apparatus includes a processor and a memory. The memory stores computer instructions, and the processor runs the computer instructions to complete the following operations: obtaining first source code that can run on a first platform, and performing syntactic analysis on the first source code to generate a syntax tree; converting at least one to-be-converted syntax block according to a conversion rule provided by a rule library, to obtain at least one converted syntax block; and generating, based on the at least one converted syntax block, second source code that can run on a second platform.

In another possible implementation, the processor runs the computer instructions to complete the following operations: for each to-be-converted syntax block, analyzing the to-be-converted syntax block to obtain a semantic condition of the to-be-converted syntax block; and selecting, from the rule library, a conversion rule that matches the semantic condition of the to-be-converted syntax block, and modifying the to-be-converted syntax block, to obtain a converted syntax block.

In a possible implementation, the to-be-converted syntax block in the syntax tree of the first source code includes at least one of a built-in function syntax block, an inline assembly code syntax block, and an intrinsic header file syntax block.

In another possible implementation, the rule library includes three groups of rules. The first group of rules are a built-in function syntax rule and a built-in function conversion rule corresponding to the built-in function syntax rule. The built-in function syntax rule can be used to identify a built-in function syntax block. The built-in function conversion rule is used to convert the identified built-in function syntax block. The second group of rules are an inline assembly code syntax rule and an inline assembly code conversion rule corresponding to the inline assembly code syntax rule. The inline assembly code syntax rule can be used to identify an inline assembly code syntax block. The inline assembly code conversion rule is used to convert the identified inline assembly code syntax block. The third group of rules are an intrinsic header file syntax rule and an intrinsic header file conversion rule corresponding to the intrinsic header file syntax rule. The intrinsic header file syntax rule can be used to identify an intrinsic header file syntax block. The intrinsic header file conversion rule is used to convert the identified intrinsic header file syntax block.

In another possible implementation, the built-in function syntax rule specifies a first syntax structure of the built-in function syntax block, a name of a built-in function corresponding to the built-in function syntax block, and a first attribute of the built-in function, the first syntax structure is used to indicate syntax composition of the built-in function syntax block, and the first attribute is used to indicate that the built-in function is called by a user file. The processor runs the computer instructions to further complete the following operations: identifying the built-in function syntax block according to the built-in function syntax rule; and selecting, from the rule library based on a semantic condition of the built-in function syntax block, a built-in function conversion rule that matches the semantic condition of the built-in function syntax block, and modifying the built-in function syntax block, to obtain a converted syntax block.

In another possible implementation, the inline assembly code syntax rule specifies a second syntax structure of the inline assembly code syntax block and a second attribute of inline assembly code corresponding to the inline assembly code syntax block, the second syntax structure is used to indicate syntax composition of the inline assembly syntax block, and the second attribute is used to indicate that the inline assembly code is included in the user file. The processor runs the computer instructions to further complete the following operations: identifying the inline assembly code syntax block according to the inline assembly code syntax rule; and selecting, from the rule library based on a semantic condition of the inline assembly code syntax block, an inline assembly code conversion rule that matches the semantic condition of the inline assembly code syntax block, and modifying the inline assembly code syntax block, to obtain a converted syntax block.

In another possible implementation, the intrinsic header file syntax rule includes a third syntax structure of the intrinsic header file syntax block, and the third syntax structure is used to indicate syntax composition of the intrinsic header file syntax block. The processor runs the computer instructions to further complete the following operations: identifying the intrinsic header file syntax block according to the intrinsic header file syntax rule; and selecting, from the rule library based on a semantic condition of the intrinsic header file syntax block, an intrinsic header file conversion rule that matches the semantic condition of the intrinsic header file syntax block, and modifying the intrinsic header file syntax block, to obtain a converted syntax block.

In another possible implementation, the rule library further includes a built-in function association rule and a built-in function association conversion rule corresponding to the built-in function association rule. The built-in function association rule includes searching for a built-in function association syntax block associated with the built-in function syntax block. The processor runs the computer instructions to further complete the following operations: determining the built-in function association syntax block according to the built-in function association rule provided by the rule module, where the built-in function association syntax block is a declaration of the built-in function or a definition of the built-in function; and selecting, from the rule library based on a semantic condition of the built-in function association syntax block, a built-in function association conversion rule that matches the semantic condition of the built-in function association syntax block, and modifying the built-in function association syntax block, to obtain a converted syntax block.

In another possible implementation, the rule library further includes an inline assembly code association rule and an inline assembly code association conversion rule corresponding to the inline assembly code association rule. The inline assembly code association rule includes searching for an inline assembly code association syntax block associated with the inline assembly code syntax block. The processor runs the computer instructions to further complete the following operations: determining the inline assembly code association syntax block according to the inline assembly code association rule provided by the rule library, where the inline assembly code association syntax block is a definition of a variable or a declaration of a function in the inline assembly code; and selecting, from the rule library based on a semantic condition of the inline assembly code association syntax block, an inline assembly code association conversion rule that matches the semantic condition of the inline assembly code association syntax block, and modifying the inline assembly code association syntax block, to obtain a converted syntax block.

In another possible implementation, before generating the second source code that can run on the second platform, the processor is further configured to generate a semi-structured result file based on the to-be-converted syntax block and the converted syntax block, where the semi-structured result file includes a location of the to-be-converted syntax block in the first source code and source code corresponding to the converted syntax block.

In another possible implementation, the processor runs the computer instructions to further complete the following operations: receiving a modification made by a user to the semi-structured result file; and generating, based on a semi-structured result file obtained after the modification made by the user, the second source code that can run on the second platform.

Technical effects that can be achieved by the cross-platform code conversion apparatus and the possible implementations provided in the second aspect are the same as technical effects that can be achieved by the cross-platform code conversion method and the possible implementations in the first aspect. Details are not described herein again.

According to a third aspect, this application provides a computer-readable storage medium. The computer-readable storage medium stores instructions, and when the instructions are run on a computer, the computer is enabled to perform the method according to the first aspect and the possible implementations. The computer-readable storage medium includes but is not limited to one or more of the following: a read-only memory (ROM), a programmable ROM (PROM), an erasable PROM (EPROM), a flash memory, an electrically EPROM (EEPROM), and a hard drive (Hard drive).

According to a fourth aspect, this application provides a computer program product. When the computer program product is run on a computer, the computer is enabled to perform the method according to the first aspect and the possible implementations.

According to a fifth aspect, this application further provides a chip. The chip includes a processor circuit and a storage circuit, the storage circuit stores computer program code, and the processor circuit executes the computer program code stored in the storage circuit, to complete the method according to the first aspect and other possible implementations. In a specific implementation process, the chip may be implemented in a form of a central processing unit (CPU), a micro controller unit (MCU), a micro processing unit (MPU), a digital signal processor (DSP), a system-on-a-chip (SoC), an application-specific integrated circuit (ASIC), a field programmable gate array (FPGA), or a programmable logic device (PLD).

According to a sixth aspect, this application further provides a chip. The chip includes a processor circuit and a storage circuit, the storage circuit is configured to store computer program code, the processor circuit reads the computer program code from an external memory and stores the computer program code in the storage circuit, and the processor circuit executes the computer program code stored in the buffer circuit, to complete the method according to the first aspect and other possible implementations. In a specific implementation process, the chip may be implemented in a form of a central processing unit (CPU), a micro controller unit (MCU), a micro processing unit (micro processing unit, MPU), a digital signal processor (DSP), a system-on-a-chip (SoC), an application-specific integrated circuit (ASIC), a field programmable gate array (FPGA), or a programmable logic device (PLD).

According to a seventh aspect, this application further provides a code conversion rule data structure, and the code conversion rule data structure includes: a built-in function syntax rule and a built-in function conversion rule corresponding to the built-in function syntax rule; an inline assembly code syntax rule and an inline assembly code conversion rule corresponding to the inline assembly code syntax rule; and an intrinsic header file syntax rule and an intrinsic header file conversion rule corresponding to the intrinsic header file syntax rule.

In a possible implementation of the seventh aspect, the built-in function syntax rule includes a first syntax structure of the built-in function syntax block, a name of a built-in function corresponding to the built-in function syntax block, and a first attribute of the built-in function, the first syntax structure is used to indicate syntax composition of the built-in function syntax block, and the first attribute is used to indicate that the built-in function is called by a user file. The built-in function conversion rule corresponding to the built-in function syntax rule includes modifying the name of the built-in function.

In another possible implementation of the seventh aspect, the inline assembly code syntax rule includes a second syntax structure of the inline assembly code syntax block and a second attribute of inline assembly code corresponding to the inline assembly code syntax block, the second syntax structure is used to indicate syntax composition of the inline assembly syntax block, and the second attribute is used to indicate that the inline assembly code is included in the user file. The inline assembly code conversion rule corresponding to the inline assembly code syntax rule includes modifying an assembly instruction name and modifying an operand attribute.

In another possible implementation of the seventh aspect, the intrinsic header file syntax rule includes a third syntax structure of the intrinsic header file syntax block, and the third syntax structure is used to indicate syntax composition of the intrinsic header file syntax block. The intrinsic header file conversion rule corresponding to the intrinsic header file syntax rule includes modifying an intrinsic header file name.

In another possible implementation of the seventh aspect, the rule library further includes a built-in function association rule and a built-in function association conversion rule corresponding to the built-in function association rule, the built-in function association rule includes searching for a built-in function association syntax block associated with the built-in function syntax block, and the built-in function association conversion rule corresponding to the built-in function association rule includes adding a declaration or a definition of the built-in function.

In another possible implementation of the seventh aspect, the rule library further includes an inline assembly code association rule and an inline assembly code association conversion rule corresponding to the inline assembly code association rule, the inline assembly code association rule includes searching for an inline assembly code association syntax block associated with the inline assembly code syntax block, and the inline assembly code association conversion rule corresponding to the inline assembly code association rule includes adding a definition of a variable used by the inline assembly code.

DESCRIPTION OF EMBODIMENTS

The following describes technical solutions of this application with reference to accompanying drawings.

Figure 1:
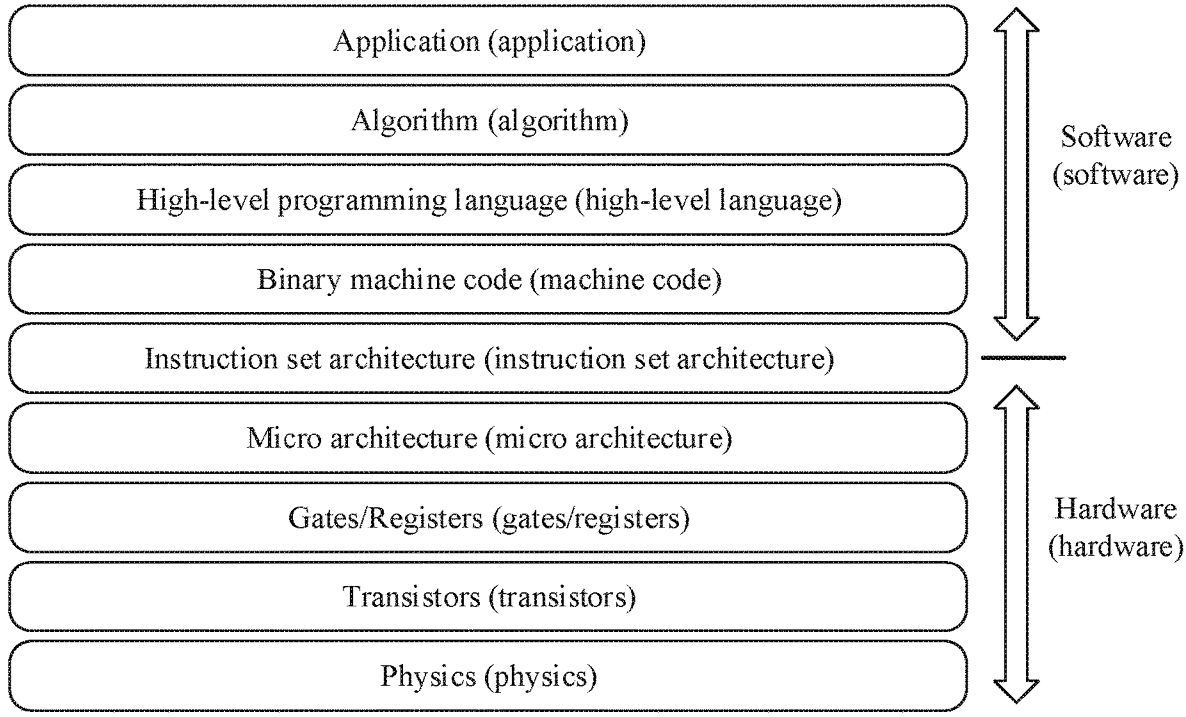
FIG. 1 is a schematic flowchart from writing to executing of code according to an embodiment of this application.

Embodiments of this application are mainly applied to the field of computer software technologies. FIG. 1 shows a procedure from writing to executing of software source code. An algorithm and an application are located on the top, the soul of the code, and a top-layer computing principle of the entire code. A high-level programming language is a code language written by a programmer, including C, C++, or the like. A source code program of each software is also written in the high-level programming language. The high-level programming language is converted into an assembly language after being assembled by a compiler. Then, the assembly language is converted into different machine code based on different instruction set architectures. An instruction set may be understood as a bridge between software and hardware, and is a set of instructions used to calculate and control a computer system in a central processing unit (CPU). Each CPU is designed to specify a series of instruction systems that cooperate with other hardware circuits. Advancement of the instruction set also affects performance of the CPU, and is also an important indicator of the performance of the CPU. The instruction set is a specification for the CPU to process instructions and data, and a user can operate a computer only by entering instructions in a specified format. Therefore, the instruction set is user oriented. A micro architecture is oriented to a CPU designer. By designing an instruction execution unit of the processor, when the entire design is completed, an architecture of a complete set of microprocessors that execute specified instructions is referred to as the micro architecture. Therefore, the "micro architecture" is a specific "implementation" of the "instruction set". Gates/Registers, transistors, and physics are pure hardware descriptions of processors.

It can be learned from the foregoing descriptions that, because some processors use different instruction set architectures, source code written for an instruction set architecture cannot directly run successfully on computing platforms (processors) that use different instruction set architectures. With rapid development of major computing platforms, software application developers also want to run respectively developed software on a plurality of computing platforms. Therefore, many software porting (source code migration) requirements emerge.

Before specific embodiments provided in this application are described, some professional nouns are first explained.

Compiler (Compiler): The compiler is a type of system software that converts source code written in a high-level programming language into another low-level language (machine code or target code). The compiler aims to translate source code programs written in high-level computer languages that are easy to write, read, and maintain into low-level machine language programs that can be interpreted and executed by computers, that is, executable files.

Figure 2:
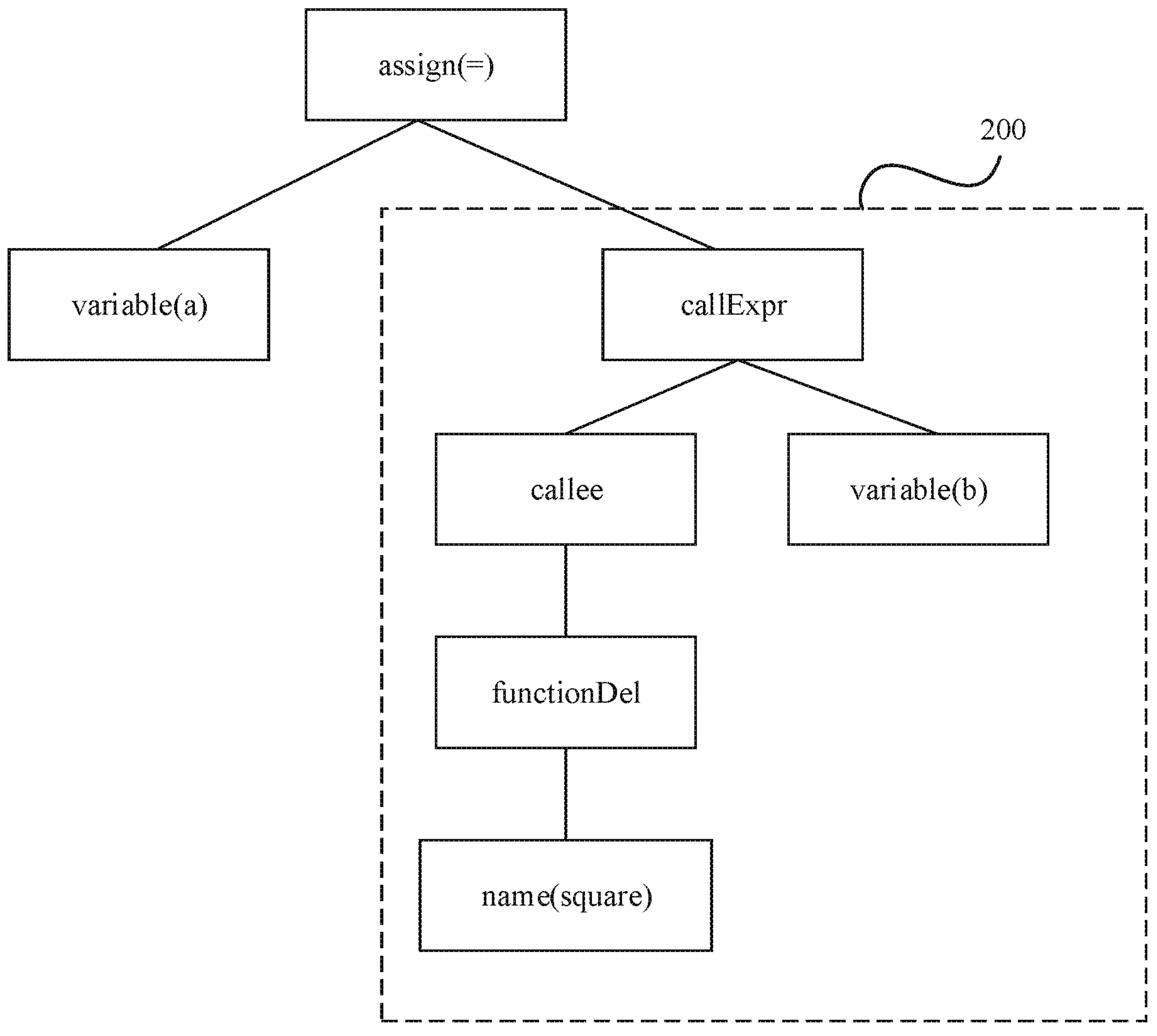
FIG. 2 is a schematic diagram of a structure of a syntax tree according to an embodiment of this application.

Abstract syntax tree (Abstract Syntax Tree): The abstract syntax tree is referred to as a syntax tree (Syntax tree) for short, is an abstract representation of a syntax structure of source code, and represents a syntax structure of a programming language in a form of a tree. Each node in the tree represents a structure in the source code. In the following descriptions, the abstract syntax tree is directly represented by the term "syntax tree". FIG. 2 shows a syntax tree corresponding to a simple function "a=square(b)". A top-layer node in the syntax tree represents an assignment statement. A node on the left is a variable a. In addition, "callExpr" on the right indicates a function call expression, including an invoker and a variable b. The callee callee is actually a square function. It should be noted that a plurality of syntax trees may be generated for same code. The syntax trees may not be completely the same in terms of literal expressions, but overall structures and functions are the same. This mainly depends on habits or requirements of personnel who use the syntax trees. For example, some syntax trees further carry a location of a node in the code.

Syntactic analysis (Syntactic analysis, parsing): Syntactic analysis is an important function of the compiler, and is a process of analyzing, based on a specific grammar, an input text that forms a word sequence, and determining a syntax structure. Through syntactic analysis, all information in an input source file is verified, and an internal data structure of the compiler, that is, the syntax tree, is generated.

Inline assembly (Inline assembly): Inline assembly is a high-level function supported by the compiler, and embeds a low-level assembly statement into a high-level language for execution, such as C/C++. GCC supports a more powerful inline assembly function, and allows the user to specify use of an operand in inline assembly, for example, specifies a C/C++ variable or a physical register. Inline assembly is mainly used to execute a system call, improve code execution efficiency, and execute a processor-specific instruction.

Intrinsic function (Intrinsic function): The intrinsic function is a function that can be called by the compiler, and encapsulates language extension or platform-related capabilities into a series of extension functions defined in a C/C++ header file for a developer to call after the developer references the header file.

Built-in function (Built-in function): The built-in function is a function that can be called by the compiler, and encapsulates platform-related capabilities into a series of basic extension functions of the compiler for a developer to directly call.

Software migration (Software Migration): Software migration is also referred to as source code migration, and migrates software (source code) from one platform to another platform. A platform-related feature used by the software needs to be equivalently implemented on the another platform through rewriting, simulation, binary translation, or the like. To successfully implement software migration, some code generally needs to be converted.

Before the following content is described, "code conversion" and "software migration" are first explained. As described above, "software migration" means to migrate software from a source platform to a target platform, which is overall migration of source code; and "code conversion" means to perform identification and conversion on a part that needs to be modified in initial source code and retain original information for a code block that does not need to be modified. Therefore, in embodiments of this application, "code conversion" is a prerequisite for implementing "software migration", an objective of "code conversion" is to implement "software migration (code migration)", and essences of the two are the same.

Because processors of major vendors use different instruction set architectures, a same segment of source code is converted into different machine code after compilation. Such differences cause some problems. For example, source code of application software is written for an x86 architecture. When a developer of the software wants to port the software to another computing platform, if the software is directly ported, the source code cannot successfully run on the new computing platform due to a difference of instruction sets used by computing platforms. Therefore, the source code needs to be modified (converted), so that the software can properly run on the new computing platform.

In the conventional technology, software (source code) migration is mainly performed by using the following two methods.

Figures 3, 4:
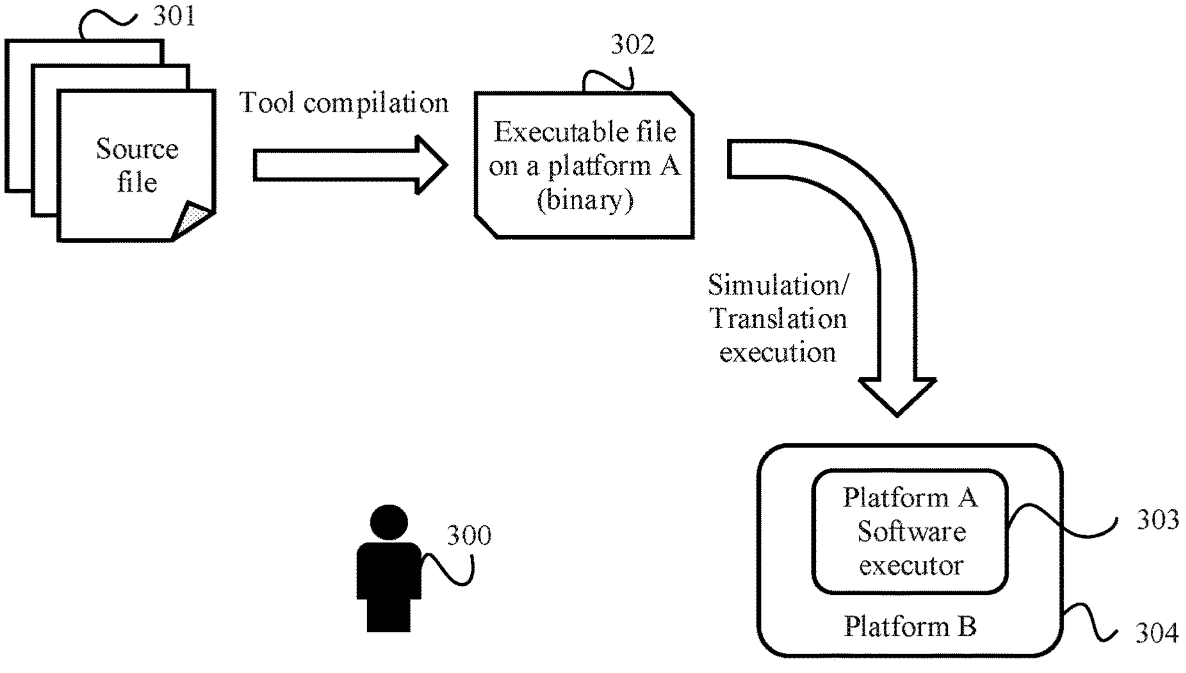
FIG. 3 is a schematic flowchart of Method 1 in the conventional technology according to an embodiment of this application.
FIG. 4 is a schematic flowchart of Method 2 in the conventional technology according to an embodiment of this application.

Method 1 in the conventional technology: Use an application software executor. As shown in FIG. 3, it is assumed that a developer (a user 300) of application software wants to migrate the software from a computing platform A (platform A for short) to a computing platform B (platform B for short), and instruction set architectures used by the computing platforms A and B are different. In this case, a set of executors running on the computing platform B and supporting application software on the platform A are required. Source code 301 of the application software is written based on an architecture of the platform A. First, the source code is compiled into a binary executable file 302 on the platform A by using a compilation tool. Then, the source code is executed on the platform B by using an executor 303. Early executors are simulated by software. Due to poor performance, many technology companies have developed binary translation executors, and the binary translation executors can simultaneously perform translation and execution with the cooperation of software running, so that performance of an executed program is performed.

However, Method 1 in the conventional technology has many disadvantages. First, performance is relatively poor, and even if a binary translation technology is used, a result is not satisfactory. Second, an application software developer cannot perform maintenance, performance tuning (Performance Tuning), and secondary development. For the application software developer 300, the executor is only a function black box. Once an error occurs in the executor or performance cannot meet an expectation of an end user, the software developer 300 cannot perform maintenance, tuning, or secondary development on an application of the software developer. In other words, the software developer only selects to accept an executor's result or abandon migration. Finally, the executor becomes a long-term dependency and a single point of failure for the enterprise software developer 300 and a target migration platform (the platform B). Due to a high technical threshold and high technical complexity of the executor, related enterprises need to spend a large amount of research and development manpower and subsequent maintenance.

Method 2 in the conventional technology: Use tool-assisted manual migration. It is assumed that a user (enterprise software developer) 300 still wants to migrate self-developed application software from a platform A to a platform B. As shown in FIG. 4, a feature of manual migration is that a large engineering team 400 is required to review source code of the user 300, find a part that needs to be modified in the source code, and then make a manual modification. As a quantity of projects increases, related modification experience can be slowly accumulated and developed into a manual 401, which can be used as a reference for subsequent project migration. To improve efficiency, the engineering team 400 may develop a code scanning tool 402 based on string source matching to find a source file to locate a migration point. The migration point means a place that needs to be modified in the source file when the source code is migrated from the platform A to the platform B, and is mainly determined by a distinct feature between the platforms.

This solution also has some disadvantages. First, manual migration is inefficient and requires manual search, matching, and modification. Even if a tool can help scan a source file to locate a migration point, efficiency improvement is limited due to low accuracy. Under heavy load and high-intensity delivery pressure, it is likely to make mistakes and cause immeasurable losses. Second, migration experience accumulation is relatively primitive and sharing is not systematic. Consequently, migration experience cannot be effectively obtained by users in need. In addition, more importantly, manual migration requires the engineering team 400 to directly access the source code of the user 300. In terms of information security, trust of many users with core technology research and development capabilities still cannot be obtained.

To resolve the foregoing problems, an embodiment of this application provides a fast, secure, and accurate cross-platform code conversion method, to implement efficient software migration.

Descriptions of an Overall Logical Architecture of Cross-Platform Code Conversion (Migration)

Figure 5:
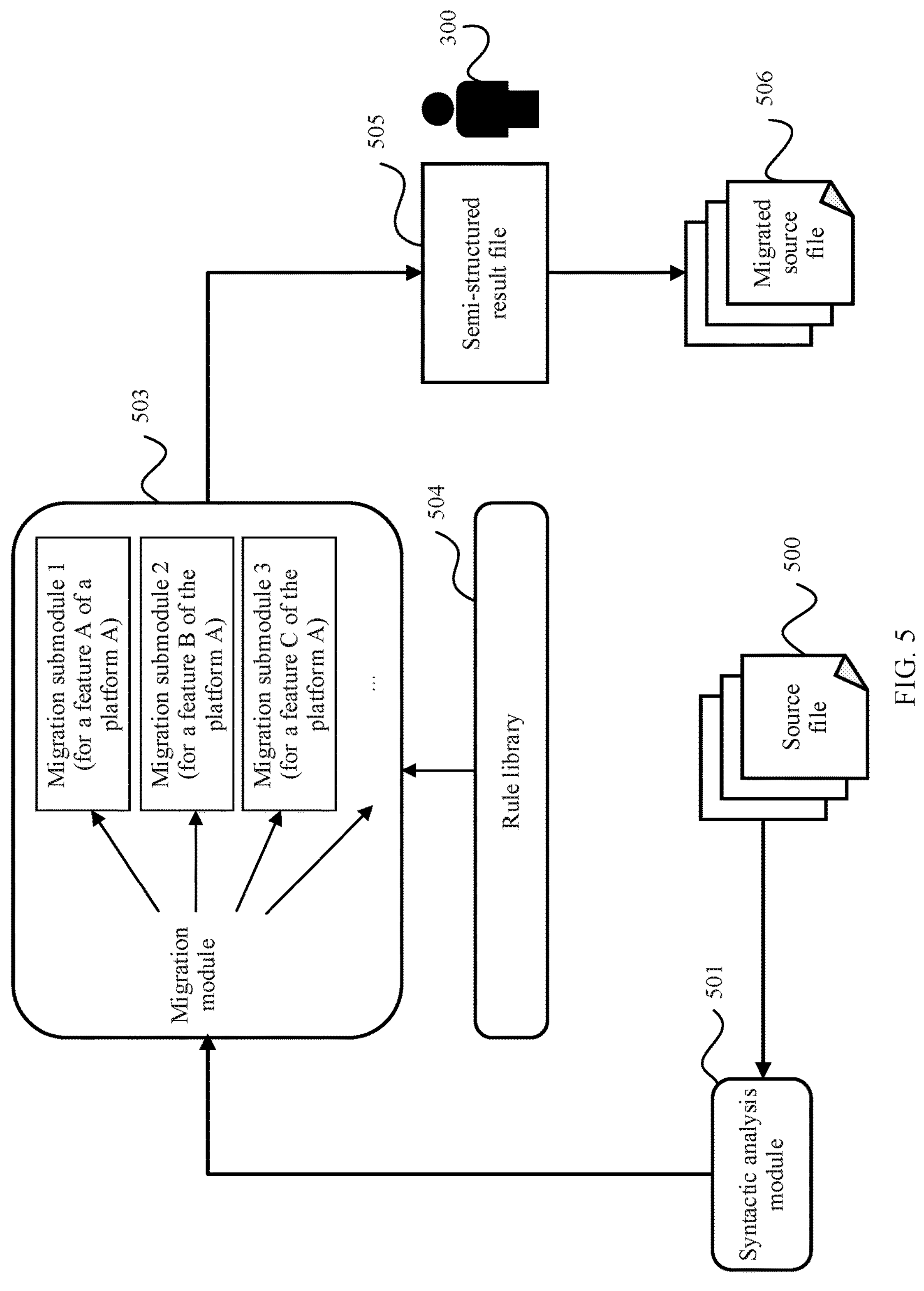
FIG. 5 is a schematic diagram of an overall logical architecture of cross-platform code conversion according to an embodiment of this application.

An embodiment of this application provides a code conversion method for implementing cross-platform software migration. Herein, "cross-platform" means to migrate code from one source platform to another different target platform. The source platform and the target platform may be two computing platforms that use different instruction set architectures, or may be computing platforms that use different versions of a same instruction set architecture. The following describes the overall logical architecture of this embodiment of this application by using an example in which software source code written for a computing platform A is migrated to a computing platform B, as shown in FIG. 5. A core invention point of this embodiment of this application mainly focuses on a migration module 503 and a rule library 504. A user 300 having a migration requirement enters a software source code file 500 that the user wants to migrate, and then a syntactic analysis module 501 generates a syntax tree. Optionally, the syntactic analysis module 501 may be directly an existing syntactic analyzer in a compiler. The migration module 503 has a plurality of migration submodules, and each migration submodule corresponds to one distinct feature between the platform A and the platform B. For example, a migration submodule 1 mainly modifies a feature A, a migration submodule 2 mainly modifies a feature B, and a migration submodule 3 mainly modifies a feature C. It should be noted that a quantity of migration submodules (distinct features between the platforms) is not specifically limited, and is mainly determined by both the source platform (the platform A) and the target platform (the platform B). For example, the migration submodule 1 locates a to-be-converted syntax block related to the feature A in the source code syntax tree according to a syntax rule provided by the rule library 504. The to-be-converted syntax block is a subset of the entire source code syntax tree. After locating the to-be-migrated syntax block, the migration submodule 1 analyzes semantics of the to-be-migrated syntax block to obtain a constraint, and then selects a matched conversion rule from the rule library based on the constraint to convert the to-be-migrated syntax block. After all distinct features are converted, one or more semi-structured result files 505 are generated. The semi-structured result file 505 includes a location of the to-be-converted syntax block in the source code and code that is obtained after the to-be-converted syntax block is modified. Optionally, the user 300 may review or adjust the semi-structured result file. Finally, a converted (migrated) source code file 506 is generated based on the semi-structured result file. It should be noted that, in a process of generating converted source code, the semi-structured result file 505 is not necessary, and source code that can run on the target platform may be directly generated, which is mainly determined by a user habit and the like. The code conversion method is mainly used to identify and convert a syntax block that needs to be modified, and other syntax blocks that do not need to be modified may retain original information, so as to implement source code (software) migration.

The method provided in this embodiment of this application may be summarized as implementing cross-platform migration of source code based on "syntax +semantics". Herein, "syntax" means that syntactic analysis is performed on to-be-migrated source code to generate a syntax tree, and then a to-be-converted syntax block is located according to a syntax rule provided by the rule library 504; and "semantics" means that semantics of the to-be-converted syntax block is analyzed to obtain some constraints. A matched conversion rule is selected from the rule library 504 based on the constraints obtained through analysis of "semantics" to convert the to-be-converted syntax block, so as to generate converted source code. The method provided in this embodiment of this application has advantages of efficient implementation and accurate migration. It should be noted that, it can be learned from the foregoing descriptions that the rule library 504 mainly includes two parts. The first part is a syntax rule used to identify and locate a to-be-converted syntax block. The second part is a conversion rule used to provide conversion rules corresponding to different constraints. The following describes the content of the rule library in detail.

Process from Creating to Calling of the Rule Library

In the code conversion method provided in the foregoing embodiment, the rule library plays an important role. Therefore, before each of the foregoing steps is described in detail, a process of using the rule library is first described. For example, it is assumed that at least three features need to be modified when the source code is migrated from the instruction set architecture computing platform A to the instruction set architecture computing platform B, including a built-in function, an inline assembly, and an intrinsic header file. Therefore, from the perspective of content, the rule library includes at least rules for the three features. It should be noted that, from the perspective of functions, a rule for each feature includes two parts. The first part is a syntax rule used to locate a to-be-converted syntax block of the feature and a syntax block associated with the to-be-converted syntax block. The second part is a conversion rule used to provide a conversion rule corresponding to a constraint. In addition, the built-in function and the inline assembly code further need to adaptively modify associated syntax blocks in some cases. The rule library also includes related rules. To make the solution provided in this embodiment of this application more comprehensive, the following shows a life cycle of the rule library from being formed to being called.

Figure 6:
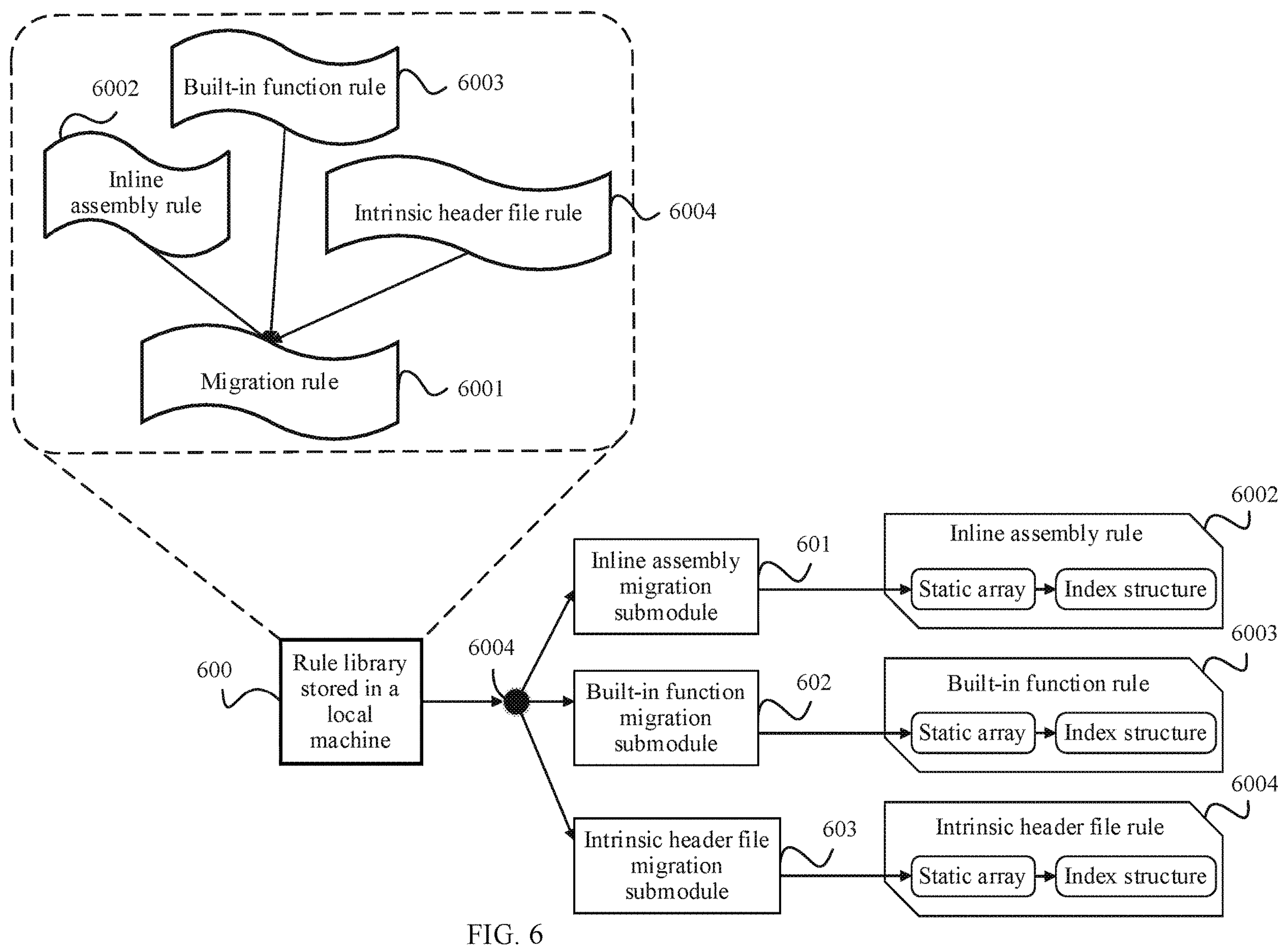
FIG. 6 is a schematic diagram of a procedure from creating to calling of a rule library according to an embodiment of this application.

As shown in FIG. 6, the rule library mainly goes through the following steps from being formed to being called.

Step 1: Research and development personnel accumulates migration experience, sorts out migration rules, and stores the rules in a local machine 600. The foregoing example is still used. At least three features from the platform A to the platform B need to be modified. Therefore, the local rule library includes at least rules corresponding to the three features: an inline assembly rule 6002, a built-in function rule 6003, and an intrinsic header file rule. A rule 6001 in the figure is mainly a common rule, for example, specifies that all rules need to be commented.

Step 2: Static selection 6004. A developer (engineering team 400) of each migration submodule selects, from the rule library in the source code, a related rule corresponding to a submodule feature, so that the submodule for each feature is associated with the corresponding rule.

Step 3: When the compiler compiles source code of the migration submodule, the migration rule is expanded into a static array.

Step 4: When a user 300 having a migration requirement runs a migration tool, in an initialization process of each migration submodule, a migration rule array is converted into a dynamic index structure, for example, a hash array, so that the migration submodule efficiently performs migration according to the migration rule.

When the engineering team 400 delivers a code conversion tool (software migration tool) or provides a code conversion method, the rules stored in the local machine have been associated with all migration submodules and expanded into static arrays (step 3). When the user 300 performs migration according to the provided code conversion method, the static array is loaded into the dynamic index structure (step 4) for each migration submodule to call.

It should be noted that, in the foregoing embodiment, the rule library is summarized and compiled by the engineering development team 400, is included in the source code of the migration tool for unified construction, and is released in a binary code form. However, in an actual situation, the rule library can also be independently released and updated in the binary code form. In addition to the provider (engineering team 400) of the rule library, many common users can also participate in accumulation and compilation of the rule library according to guidance or preset rules. A release form of the rule library and a method for updating and maintaining the rule library are not specifically limited in this embodiment of this application.

Overall Method Procedure of Cross-Platform Code Conversion (Migration)

Figure 7:
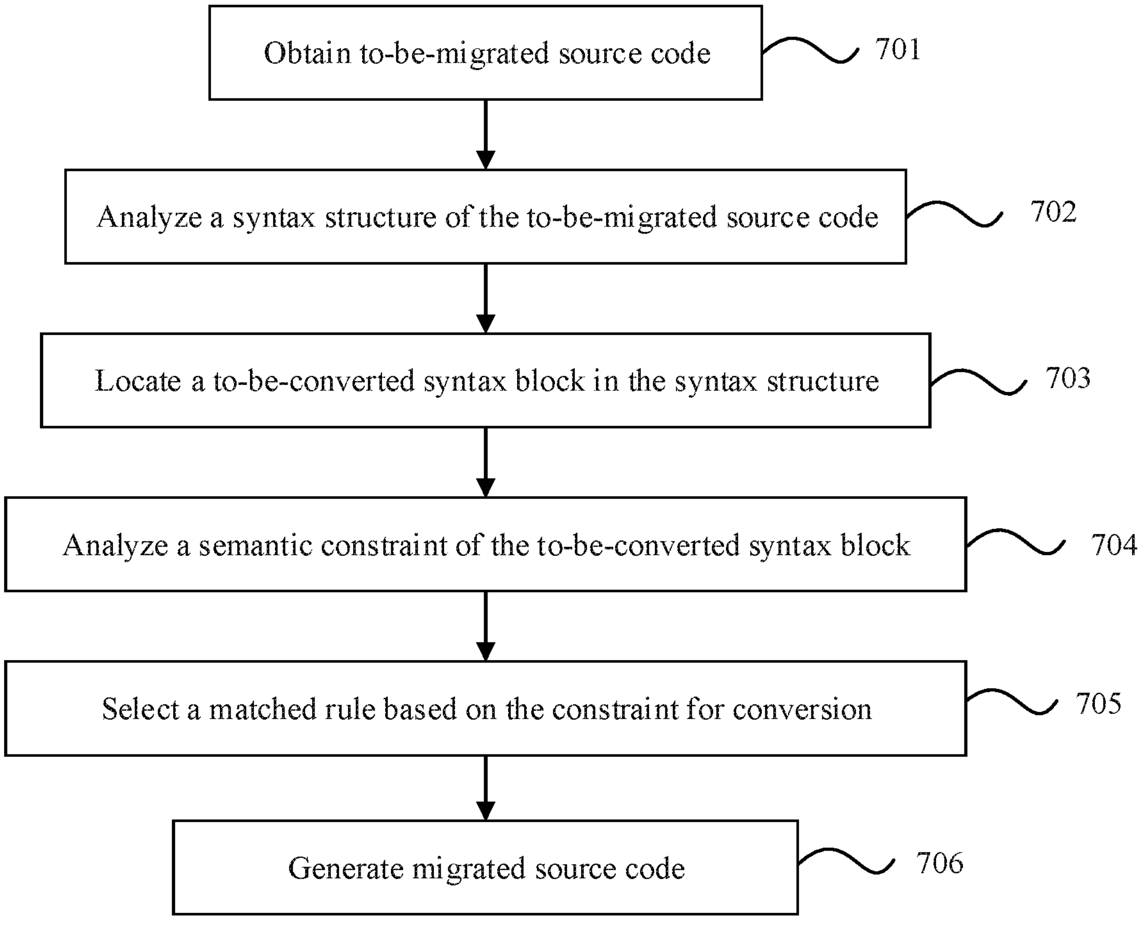
FIG. 7 is a schematic flowchart of an overall cross-platform code conversion method according to an embodiment of this application.

The following describes the overall method procedure provided in this embodiment of this application. An example in which source code written for the platform architecture A is migrated to the platform B for running is still used. FIG. 7 shows overall steps.

Step S701: Obtain first source code that can run on a first platform. The source code may be C, C++, or the like. A language type of the source code is not specifically limited in this application.

Step S702: Analyze the first source code to generate a syntax tree corresponding to the first source code. It should be noted that analyzing the source code to generate the corresponding syntax tree may be implemented by directly calling a syntactic analyzer in a compiler, or may be implemented by rewriting a syntactic analyzer.

Figure 8:
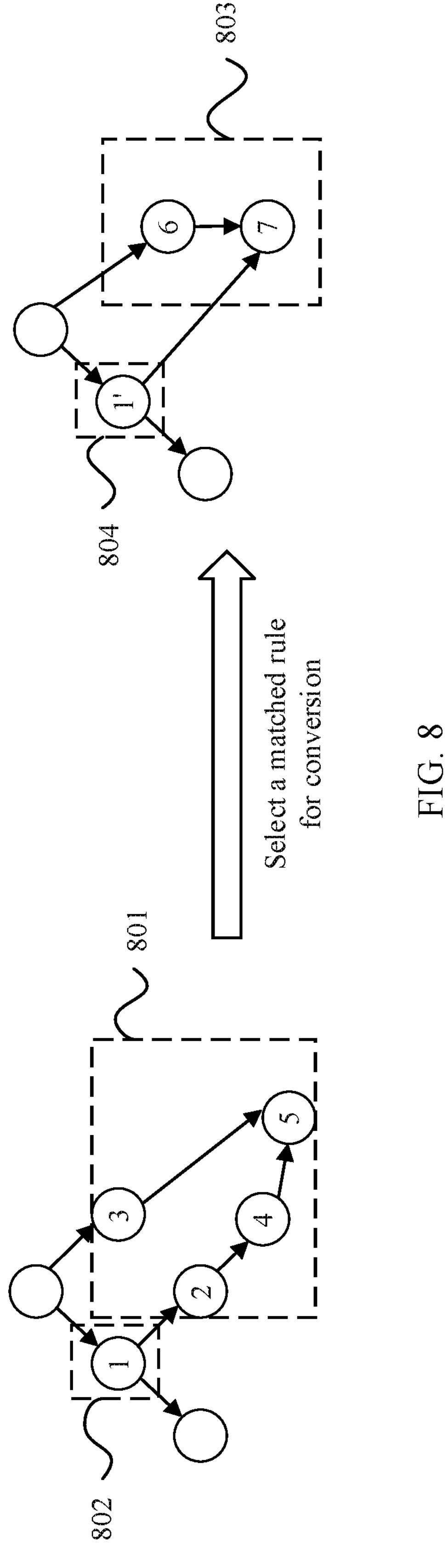
FIG. 8 is a schematic diagram of changes of a to-be-converted syntax block that are generated before and after conversion according to an embodiment of this application.

Step S703: Determine a to-be-converted syntax block in the syntax tree. According to a syntax rule provided by the rule library, a syntax block that needs to be modified in the syntax tree corresponding to the source code can be determined. As shown in FIG. 8, according to the syntax rule provided by the rule library, it is determined that a syntax block 801 in the syntax tree needs to be modified. In addition to the to-be-migrated syntax block, a syntax block 802 associated with the to-be-migrated syntax block further needs to be determined in some cases. After the to-be-migrated syntax block 801 is modified, content and a structure greatly change, but a structure of the associated syntax block 802 basically does not change.

Step S704: Analyze semantics of the to-be-converted syntax block to obtain a constraint. This step is an embodiment of "semantic analysis". It means that the semantics of the to-be-converted syntax block needs to be analyzed to obtain some constraints. For example, the constraint may be a mode (a single instruction or a plural of instructions) of an inline assembly instruction included in the to-be-migrated syntax block, which is specifically demonstrated in a subsequent embodiment.

Step S705: Select a matched conversion rule based on the constraint for conversion. The rule library provides conversion rules corresponding to various constraints. Based on the constraint obtained in step S704, one matched conversion rule may be selected from the rule library to convert the to-be-converted syntax block, so that the structure of the to-be-migrated syntax block is modified from 801 to 803, and the associated syntax block 802 is also adaptively modified to 804.

Step S706: Generate migrated source code. Optionally, before the migrated source code is directly generated, a semi-structured result file may be first generated. The semi-structured result file includes at least a location of the to-be-migrated syntax block in the source code and corresponding code that is obtained after the to-be-converted syntax block is modified. Based on the semi-structured result file, code that needs to be modified in the source code may be located and then modified. The semi-structured result file may be a file in a JSON format or a file in an XML format. A type of the file is not specifically limited in this embodiment of this application.

According to the code conversion method provided in this embodiment of this application, the to-be-converted syntax block is accurately identified based on "syntactic analysis", and the matched conversion rule is selected based on "semantic analysis" for conversion. Compared with a conventional string matching method, this method greatly increases a code conversion success rate. In addition, in this process, the user 300 may independently complete code conversion, so as to implement software migration without participation of another user. The user 300 may review a migration status by using the semi-structured result file, and perform performance tuning or even subsequent secondary development based on this. After the overall migration procedure is described, the following specifically describes the code conversion method by using an example of migrating the source code from an x86 platform to a Kunpeng platform. For example, there are three distinct features between the x86 platform and the Kunpeng platform: a built-in function, an inline assembly, and an intrinsic header file, and modification (conversion) needs to be performed for the three types of code blocks. The following specifically describes the code conversion method for each feature.

(1) Built-In Function:

The user 300 wants to migrate source code written by the user to the platform B. After the to-be-converted source code is obtained, the syntactic analyzer is used to generate the syntax tree of the to-be-converted source code (step S702). The built-in function rule includes a built-in function syntax rule and a built-in function conversion rule. The built-in function syntax rule first specifies a syntax structure of a built-in function syntax block that needs to be modified. As shown in FIG. 2, "a=square(b)" is still used as an example. For example, a syntax structure may be callExpr→callee→functionDel, which represents a structure relationship. In addition to the syntax structure, the built-in function syntax rule further specifies some auxiliary information, such as a function name or attribute. Because many syntax structures in the entire syntax tree may be "callExpr—>callee—>functionDel", some auxiliary information is further required for determining. For example, the auxiliary information specifies that the function name is square, and the built-in function needs to be called by a file written by the user. For example, it may be identified that the to-be-converted syntax block is 200 in FIG. 2 (step S703). In some cases, to enable modified source code to successfully run on the platform B, a syntax block associated with the built-in function syntax block is further determined by performing step S703. For example, the associated syntax block may be a function declaration or a function definition.

After the syntax block is identified, semantic analysis needs to be performed (step S704). Herein, "semantics" may be understood as a function name, and a corresponding conversion rule is found based on the name of the built-in function corresponding to the to-be-converted built-in function syntax block to perform conversion. For example, the conversion rule specifies that a function name in a to-be-migrated source file is converted from "_builtin_ia32_lzcnt_u16" to "_builtin_kunpeng_lzcnt_u16" (step S705). It should be noted that the conversion rule of the built-in function herein is directly a function name modification, and is a relatively simple conversion rule. A corresponding replacement of the function name is to select a corresponding matched conversion rule based on a semantic condition (function name) to perform conversion. In addition, the conversion rule also specifies conversion of the associated syntax block. Because some x86 hardware functions cannot be implemented on the Kunpeng platform, a new built-in header file such as "kunpengbuiltin.h" needs to be inserted. In the example herein, the associated syntax block is the function declaration or the function definition, and modifying the associated syntax block is adding the Kunpeng built-in function header file before the function declaration or the function definition to help the Kunpeng platform identify the function.

(2) Inline Assembly Code:

The code that the user 300 wants to convert includes inline assembly code written by the user. After the to-be-migrated source code is obtained, the syntactic analyzer is used to generate the syntax tree of the to-be-migrated source code (step S702). The inline assembly rule includes an inline assembly syntax rule and an inline assembly conversion rule. The inline assembly syntax rule first specifies a syntax structure. For example, an inline assembly code syntax block in the syntax tree may be directly located by using "asm statement". In addition, some auxiliary information is further specified. For example, the inline assembly code needs to be written in a user file, so as to finally determine an inline assembly syntax block that needs to be migrated (step S703). Similar to the built-in function syntax rule, the inline assembly code syntax rule still specifies searching for a syntax block associated with the inline assembly code syntax block (step S703). For example, the syntax block associated with the inline assembly may be a function declaration or a definition of a variable. When the associated syntax block is the definition of the variable, it indicates that the variable is used by the to-be-converted inline assembly syntax block.

The inline assembly syntax block that needs to be modified has been determined by performing step S703. The following uses two examples to show semantic analysis and conversion for different types of inline assembly syntax blocks.

The first example is described with reference to FIG. 9 and FIG. 10. A constraint of the first example is an instruction mode: a single instruction or a compound instruction. The to-be-migrated syntax block that has been located by performing step S703 is an inline assembly syntax block 900 (after step S703). For example, the located inline assembly syntax block includes two assembly statements "ADDL E1, E0" and "LOCK; ADDL E1, E0", and functions of the two statements are to add content in E0 and E1 to E0. Addressing modes of E0 and E1 are not limited. In addition, "ADDL" and "LOCK; ADDL" is an assembly mnemonic 901 of the platform A, and "E1, E0" is an assembly operand 902 of the platform A. Semantic analysis and conversion are performed on the two assembly statements below.

Figure 11:
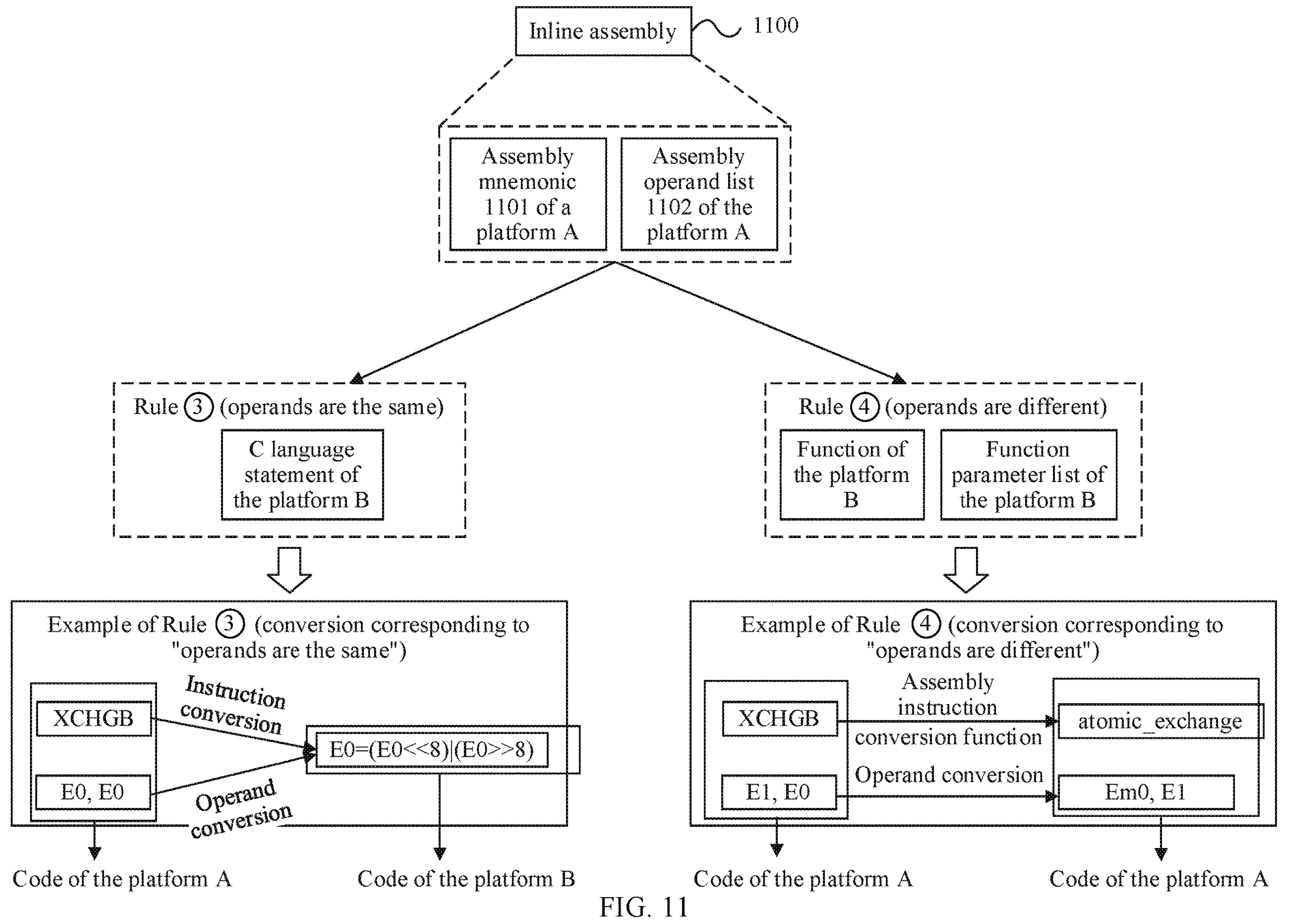
FIG. 11 is another schematic diagram of performing semantic analysis and conversion on an inline assembly syntax block according to an embodiment of this application.

Operation code of the first inline assembly statement "ADDL E1, E0" is "ADDL", and can be used independently (single-instruction mode), which indicates operand addition (step S704). The single-instruction mode is applicable to Rule ①, and the "ADDL" instruction needs to be converted into an instruction "ADD" of the platform B. In addition, the platform B specifies that an operand of the "ADD" instruction needs to be a register, and the instruction needs to have three operands. Therefore, the operands are modified from "E1, E0" to "Ew0, Ew0, Ew1" (step S705). The foregoing conversion rule for the first inline assembly instruction is embodied in the rule library by using code 1101 in FIG. 11.

In the code 1001, _A_addl is a rule name, and Rule ① specifies that the instruction "ADDL E1, E0" is converted into "ADD Ew0, Ew0, Ew1". Both the instructions indicate that content of E0 and E1 are added to E0. The only difference is that expressions are different due to a difference between the computing platforms.

Operation code of the second inline assembly statement "LOCK; ADDL E1, E0" is "LOCK; ADDL", and is a compound instruction (step S704). Atomicity of an addition operation is ensured by adding a prefix "LOCK" before "ADDL" (when an operation cannot be further divided, the operation is referred to as an atomic operation). For the compound instruction, a migration rule ② needs to be used to convert the compound instruction into calling of an equivalent atomic operation function "sync_fetch_add" on the platform B. In addition, the platform B also specifies that a first operand of "sync_fetch_add" needs to be addressed in a memory manner. Therefore, the operand is also modified from "E1, E0" to "Em0, E1" (step S705). The foregoing conversion rule for the second assembly instruction is embodied in the rule library by using code 1002 in FIG. 10.

Figure 9:
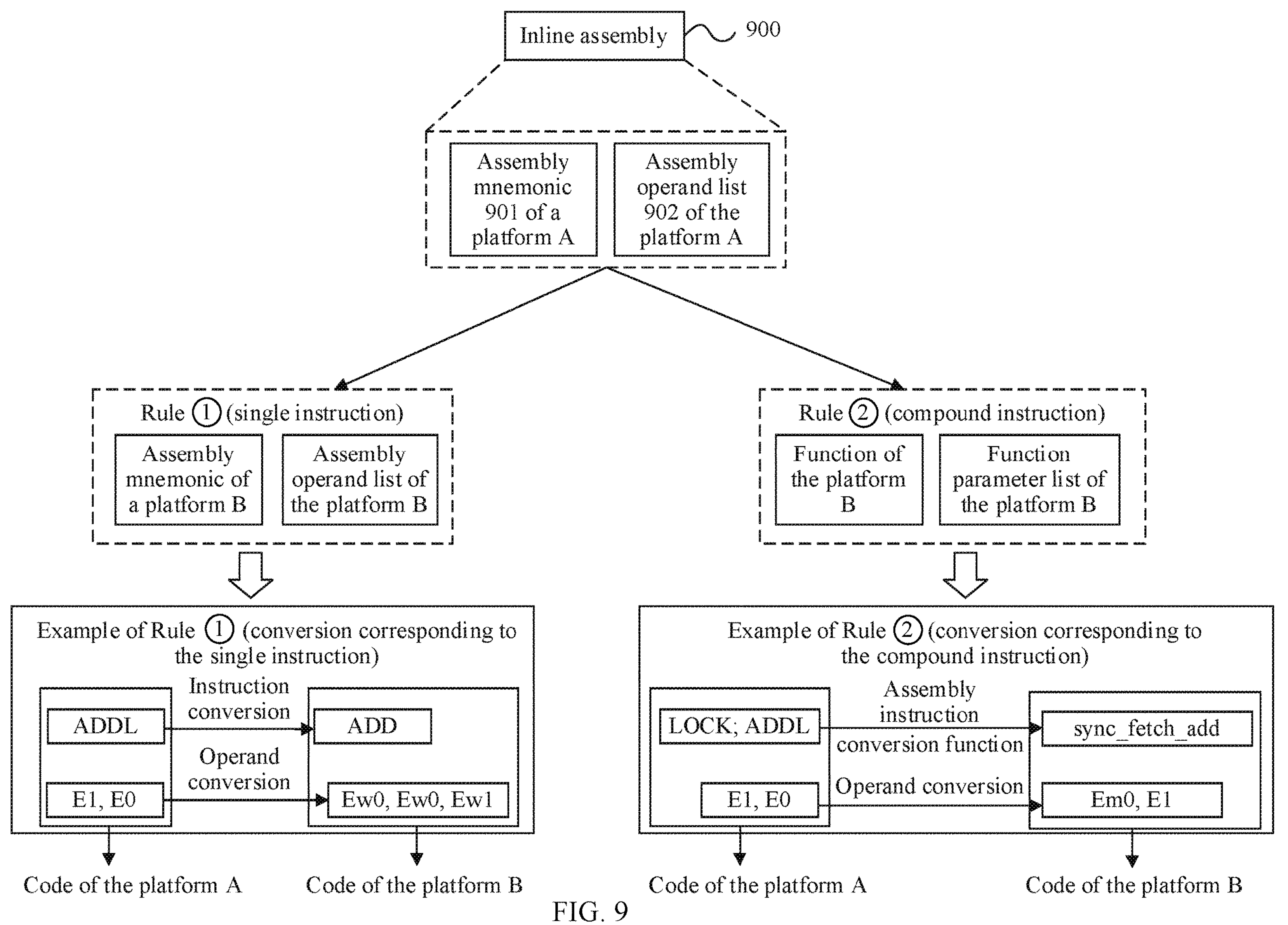
FIG. 9 is a schematic diagram of performing semantic analysis and conversion on an inline assembly syntax block according to an embodiment of this application.
Figure 10:
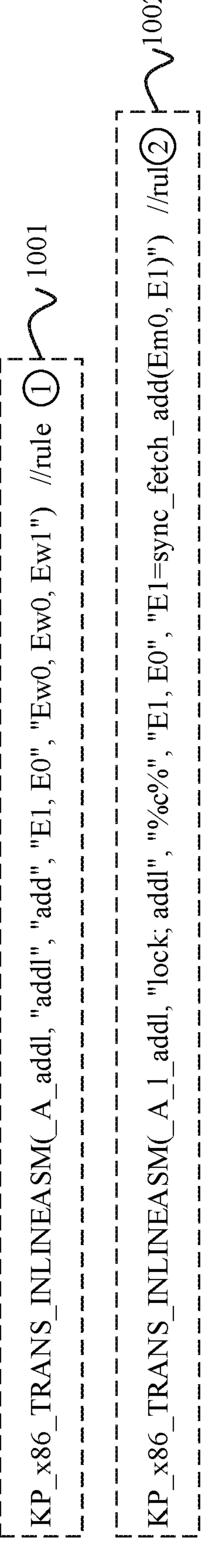
FIG. 10 shows a code implementation corresponding to FIG. 9 according to an embodiment of this application.
Figure 12:
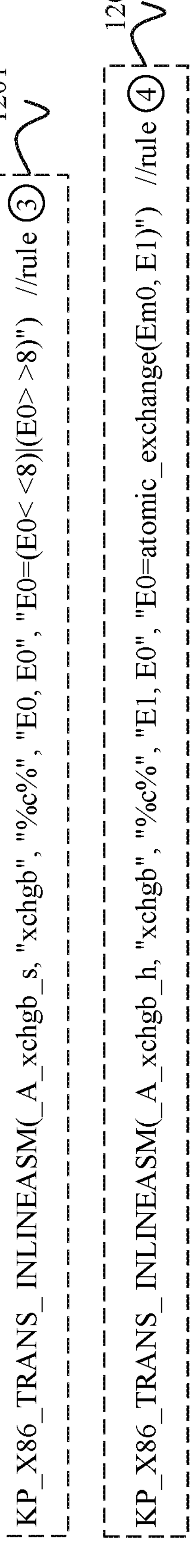
FIG. 12 shows a code implementation corresponding to FIG. 11 according to an embodiment of this application.

The conversion rule for the inline assembly syntax block that is used when the constraint is the "instruction mode" is introduced with reference to FIG. 9 and FIG. 10. The following describes the second example with reference to FIG. 11 and FIG. 12, that is, a conversion rule used when a constraint is "whether operands are the same". The to-be-migrated syntax block is still located as an inline assembly syntax block 1100 by performing step S703. For example, the located inline assembly syntax block includes two assembly statements: "XCHGB E0, E0" and "XCHGB E0, E1". Herein, "XCHGB" is an assembly mnemonic 1101 of the platform A, and "E0, E0" and "E0, E1" are operands 1102.

The first inline assembly statement is "XCHGB E0, E0". On the platform A, lower eight bits and higher eight bits of E0 can be exchanged. Operands of this statement are the same (step S704). Therefore, according to Rule ③, "XCHGB E0, E0" is directly converted into a C language statement "E0=(E0<<8)|(E0>>8)" on the platform B (step S705). The foregoing conversion rule is embodied in the rule library by using code 1201.

The second inline assembly statement is "XCHGB E0, E1". On the platform A, content of E0 and E1 can be exchanged. Operands of this statement are different (step S704). Therefore, according to Rule ④, the statement needs to be converted into a peer function on the platform B. The instruction is converted from "XCHGB" into a function "atomic exchange". In addition, the platform B specifies that a first operand of the function needs to be addressed in a memory manner. Therefore, the operand is also modified from "E0, E1" to "Em0, E1" (step S705). The foregoing conversion rule is embodied in the rule library by using code 1202.

The foregoing two examples describe two types of constraints (whether instruction modes and operands are the same), and show conversion rules corresponding to different selections under each type of constraint. It should be noted that the foregoing embodiment is merely an example of the inline assembly conversion rule, and another inline assembly conversion rule needs to be determined based on a source migration platform and a target migration platform.

In the foregoing example of selecting a matched rule based on instruction semantics for conversion, there is no modification of an associated syntax block, and the to-be-converted inline assembly code syntax block is directly converted. However, the inline assembly code sometimes still needs to search for an associated syntax block and modify the associated syntax block. For example, the associated syntax block may be a definition of a variable used for the inline assembly code, and an attribute that meets a requirement of the target migration platform may be added before the variable.

(3) Intrinsic Header File:

The source code that the user 300 wants to convert includes an intrinsic header file of an x86 platform. After the to-be-migrated source code is obtained, the syntactic analyzer is used to generate the syntax tree of the to-be-migrated source code (step S702). In terms of a feature of the intrinsic header file, an intrinsic header file syntax rule and an intrinsic header file conversion rule are included. The intrinsic header file syntax rule also specifies a syntax structure. For example, a header file syntax block is directly located by using a syntax structure such as "#" or "include" (step S703).

A corresponding conversion rule is found based on a name of a header file in an intrinsic header file syntax block that needs to be modified. For example, the conversion rule specifies that an intrinsic header file "x86intrin.h" of the x86 platform is modified into a header file "kunpengintrin.h" of the Kunpeng platform (step S705). It should be noted that the conversion rule for the intrinsic header file herein is directly conversion of a header file name, and the header file name may also be understood as "semantics" (step S704).

After the conversion rule for each feature is described, the following shows a specific case of converting inline assembly code by using Rule ③. For example, "_asm_volatile_ ("xchgb, % b0, % h0": "=q"(hello[i]): "0"(hello[i]))" is inline assembly code written for the x86 platform in the source file. To migrate the code to an ARM platform, refer to Rule ③. The operands of the assembly instruction xchgb are the same, that is, are "hello[i]". Therefore, the original inline assembly code is directly converted into "hello[i]=(hello[i]<<8|hello[i]>>8)".

According to the method provided in this application, efficient code conversion can be implemented without unnecessary manual participation. In addition, "syntactic analysis" and "semantic analysis" improve a speed and accuracy of code conversion; "semi-structured result file" enables the user to participate in code conversion and even secondary development based on this; and the entire code conversion is automatically implemented by the code conversion device, thereby preventing users' source code from being accessed by another user and ensuring information security.

The foregoing describes in detail the cross-platform code conversion method provided in embodiments of this application with reference to FIG. 5 to FIG. 12. The following describes a cross-platform code conversion apparatus provided in embodiments of this application. For details not disclosed in the apparatus embodiments of this application, refer to the method embodiments of this application.

A cross-platform code conversion apparatus provided in an embodiment of this application includes a processor and a memory, the memory stores computer instructions, and the processor executes the computer instructions to complete the following operations: obtaining first source code that can run on a first platform, and performing syntactic analysis on the first source code to generate a syntax tree of the first source code; analyzing the syntax tree of the first source code according to a syntax rule provided by a rule library, and identifying at least one to-be-converted syntax block; converting the at least one to-be-converted syntax block according to a conversion rule provided by the rule library, to obtain at least one converted syntax block; and generating, based on the at least one converted syntax block, second source code that can run on a second platform.

Optionally, the processor runs the computer instructions to complete the following operations: for each to-be-converted syntax block, analyzing the to-be-converted syntax block to obtain a semantic condition of the to-be-converted syntax block; and selecting, from the rule library based on the semantic condition of the to-be-converted syntax block, a conversion rule that matches the semantic condition of the to-be-converted syntax block, and modifying the to-be-converted syntax block, to obtain a converted syntax block.

Optionally, the to-be-converted syntax block in the syntax tree of the first source code includes at least one of a built-in function syntax block, an inline assembly code syntax block, and an intrinsic header file syntax block.

Optionally, the rule library includes: a built-in function syntax rule and a built-in function conversion rule corresponding to the built-in function syntax rule; an inline assembly code syntax rule and an inline assembly code conversion rule corresponding to the inline assembly code syntax rule; and an intrinsic header file syntax rule and an intrinsic header file conversion rule corresponding to the intrinsic header file syntax rule.

Optionally, the built-in function syntax rule includes a first syntax structure of the built-in function syntax block, a name of a built-in function corresponding to the built-in function syntax block, and a first attribute of the built-in function, the first syntax structure is used to indicate syntax composition of the built-in function syntax block, and the first attribute is used to indicate that the built-in function is called by a user file.

The processor runs the computer instructions to further complete the following operations: identifying the built-in function syntax block based on the first syntax structure of the built-in function syntax block, the name of the built-in function corresponding to the built-in function syntax block, and the first attribute of the built-in function; and selecting, from the rule library based on a semantic condition of the built-in function syntax block, a built-in function conversion rule that matches the semantic condition of the built-in function syntax block, and modifying the built-in function syntax block, to obtain a converted syntax block.

Optionally, the inline assembly code syntax rule includes a second syntax structure of the inline assembly code syntax block and a second attribute of inline assembly code corresponding to the inline assembly code syntax block, the second syntax structure is used to indicate syntax composition of the inline assembly syntax block, and the second attribute is used to indicate that the inline assembly code is included in the user file.

The processor runs the computer instructions to further complete the following operations: identifying the inline assembly code syntax block based on the second syntax structure of the inline assembly code syntax block and the second attribute of the inline assembly code corresponding to the inline assembly code syntax block; and selecting, from the rule library based on a semantic condition of the inline assembly code syntax block, an inline assembly code conversion rule that matches the semantic condition of the inline assembly code syntax block, and modifying the inline assembly code syntax block, to obtain a converted syntax block.

Optionally, the intrinsic header file syntax rule includes a third syntax structure of the intrinsic header file syntax block, and the third syntax structure is used to indicate syntax composition of the intrinsic header file syntax block.

The processor runs the computer instructions to further complete the following operations: identifying the intrinsic header file syntax block based on the third syntax structure of the intrinsic header file syntax block; and selecting, from the rule library based on a semantic condition of the intrinsic header file syntax block, an intrinsic header file conversion rule that matches the semantic condition of the intrinsic header file syntax block, and modifying the intrinsic header file syntax block, to obtain a converted syntax block.

Optionally, the rule library further includes a built-in function association rule and a built-in function association conversion rule corresponding to the built-in function association rule, and the built-in function association rule includes searching for a built-in function association syntax block associated with the built-in function syntax block.

The processor runs the computer instructions to further complete the following operations: determining that the to-be-converted syntax block is the built-in function syntax block, and determining the built-in function association syntax block according to the built-in function association rule, where the built-in function association syntax block is a declaration of the built-in function or a definition of the built-in function; and selecting, from the rule library based on a semantic condition of the built-in function association syntax block, a built-in function association conversion rule that matches the semantic condition of the built-in function association syntax block, and modifying the built-in function association syntax block, to obtain a converted syntax block.

Optionally, the rule library further includes an inline assembly code association rule and an inline assembly code association conversion rule corresponding to the inline assembly code association rule, and the inline assembly code association rule includes searching for an inline assembly code association syntax block associated with the inline assembly code syntax block.

The processor runs the computer instructions to further complete the following operations: determining that the to-be-converted syntax block is the inline assembly code syntax block, and determining the inline assembly code association syntax block according to the inline assembly code association rule, where the inline assembly code association syntax block is a definition of a variable or a declaration of a function in the inline assembly code; and selecting, from the rule library based on a semantic condition of the inline assembly code association syntax block, an inline assembly code association conversion rule that matches the semantic condition of the inline assembly code association syntax block, and modifying the inline assembly code association syntax block, to obtain a converted syntax block.

Optionally, the processor runs the computer instructions to further complete the following operations: before generating the second source code that can run on the second platform, generating a semi-structured result file based on the to-be-converted syntax block and the converted syntax block, where the semi-structured result file includes a location of the to-be-converted syntax block in the first source code and source code corresponding to the converted syntax block.

Optionally, the processor runs the computer instructions to further complete the following operations: receiving a modification made by a user to the semi-structured result file; and generating, based on a semi-structured result file obtained after the modification made by the user, the second source code that can run on the second platform.

All or some of embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, all or some of the procedure or functions according to embodiments of this application are generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Figure 13:
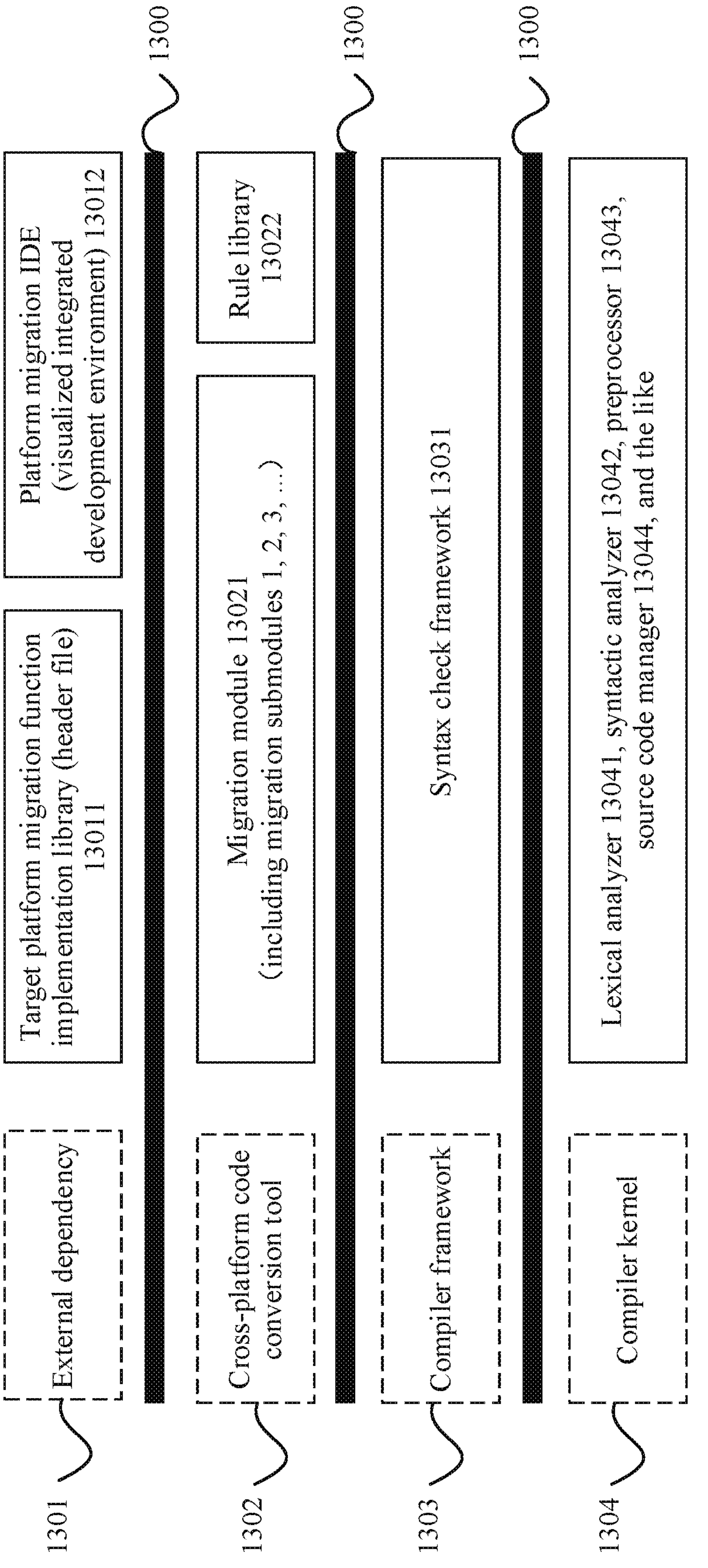
FIG. 13 is a schematic diagram of a reference implementation tool based on an open source compiler framework according to an embodiment of this application.

FIG. 13 shows a reference implementation tool based on an open source compiler framework according to an embodiment of this application. In the example herein, a cross-platform code conversion tool 1302 mainly generates a syntax tree of source code by calling a syntactic analysis capability of a compiler. FIG. 13 sequentially shows a compiler kernel 1304, a compiler framework 1303, the cross-platform code conversion tool 1302, an external dependency 1301, and an API interface 1300 from bottom to top. The compiler kernel 1304 is a bottom-layer core of the code conversion tool 1302, and mainly includes core functions of an open source compiler technology, including but not limited to a lexical analyzer 13041, a syntactic analyzer 13042, a source code manager 13044, a preprocessor 13043, and the like. The compiler framework 1303 has a well-defined interface and an extension capability, so that a developer can perform further extension based on the compiler framework. In this embodiment of this application, a syntactic analysis capability of the compiler framework is mainly extended. The cross-platform code conversion tool 1302 is a core module of this application, and mainly includes a migration module 13021 and a rule library 13022. The cross-platform code conversion tool 1302 calls the compiler kernel 1304 by using the compiler framework 1303. To better help a user 300 implement code conversion, some external tools 1301 may be further used, including a target platform migration function implementation library 13011 and a platform migration IDE 13012. The migration function implementation library 13011 may compile some common functions into header files, so that the cross-platform code conversion tool 1302 can directly call the header files. The platform migration IDE 13012 can present the migration process in a visualized manner, so that the code conversion tool 1302 is more friendly to the user.

Figure 14:
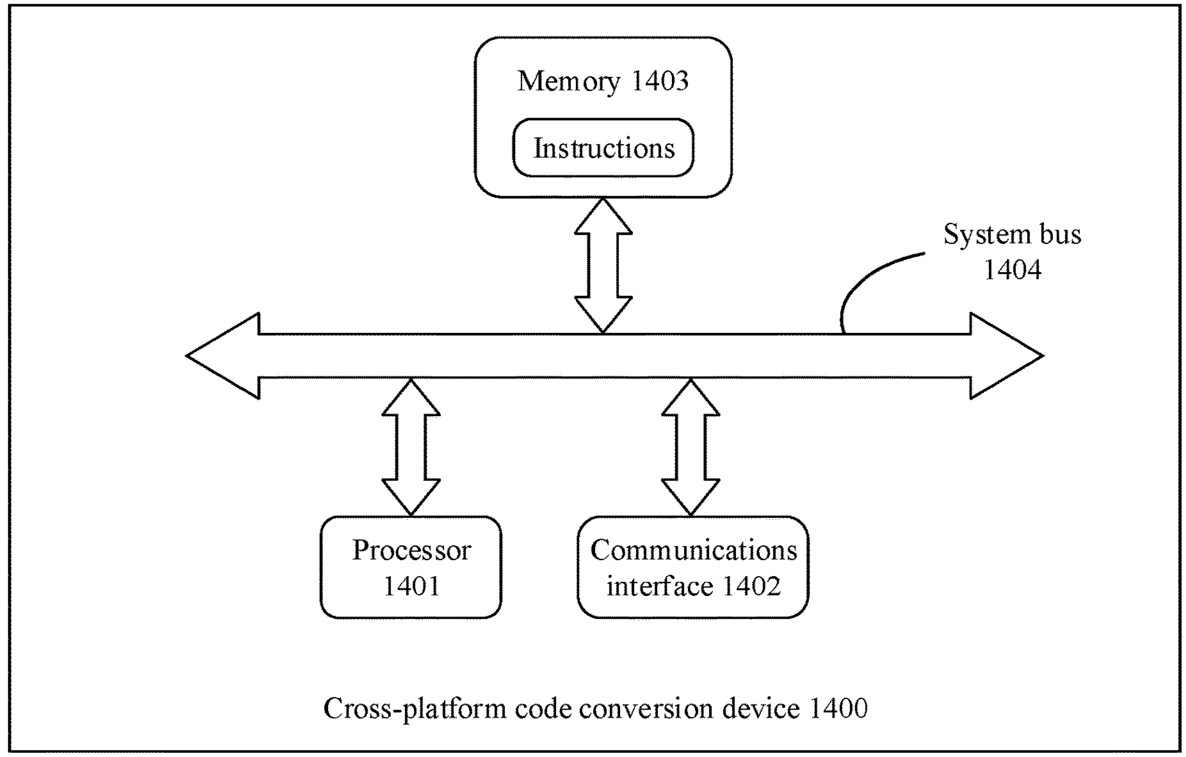
FIG. 14 is a schematic diagram of a cross-platform code conversion device according to an embodiment of this application.

FIG. 14 is a schematic diagram of a cross-platform code conversion device according to an embodiment of this application. The apparatus may include a processor 1401, a communications interface 1402, a memory 1403, and a system bus 1404. The memory 1403 and the communications interface 1402 are connected to the processor 1401 through the system bus 1404 for mutual communication. The memory 1403 is configured to store computer-executable instructions, the communications interface 1402 is configured to communicate with another device, and the processor 1401 executes the computer instructions to implement the solutions shown in the foregoing method embodiments.

The system bus mentioned in FIG. 14 may be a peripheral component interconnect (peripheral component interconnect, PCI) bus, an extended industry standard architecture (extended industry standard architecture, EISA) bus, or the like. The system bus may be classified into an address bus, a data bus, a control bus, and the like. For ease of representation, only one bold line is used to represent the bus in the figure, but this does not mean that there is only one bus or only one type of bus. The communications interface is configured to implement communication between a database access apparatus and another device (such as a client, a read/write database, or a read-only database). The memory may include a random access memory (RAM), or may include a nonvolatile memory (nonvolatile memory), for example, at least one magnetic disk storage.

The processor may be a general-purpose processor, including a central processing unit (CPU), a network processor (NP), or the like; or may be a digital signal processor DSP, an application-specific integrated circuit ASIC, a field programmable gate array FPGA or another programmable logic device, a discrete gate or a transistor logic device, or a discrete hardware component.

Optionally, an embodiment of this application further provides a storage medium. The storage medium stores instructions, and when the instructions are run on a computer, the computer is enabled to perform the method in the foregoing method embodiments.

Optionally, an embodiment of this application further provides a chip for running instructions. The chip is configured to perform the method in the foregoing method embodiments.

It can be understood that various numbers in embodiments of this application are merely used for distinguishing for ease of description, and are not used to limit the scope of embodiments of this application.

It should be understood that sequence numbers of the foregoing processes do not mean execution sequences in embodiments of this application. The execution sequences of the processes should be determined according to functions and internal logic of the processes, and should not be construed as any limitation on the implementation processes of embodiments of this application.

Finally, it should be noted that embodiments above are merely intended for describing the technical solutions of this application other than limiting this application. Although this application is described in detail with reference to embodiments, persons of ordinary skill in the art should understand that they may still make modifications to the technical solutions described in embodiments or make equivalent replacements to some or all technical features thereof, without departing from the scope of the technical solutions of embodiments of this application.

What is claimed is:

1. A cross-platform code conversion method performed by a code conversion device, comprising:

obtaining first source code configured for running on a first platform having a first processor architecture;

performing syntactic analysis on the first source code to generate a syntax tree of the first source code;

analyzing the syntax tree of the first source code according to a syntax rule provided by a rule library to identify a to-be-converted syntax block;

analyzing semantics of the to-be-migrated syntax block to obtain a constraint;

selecting a conversion rule from the rule library, based on the constraint, to convert the to-be-migrated syntax block, the rule library comprising:

a built-in function syntax rule and a built-in function conversion rule corresponding to the built-in function syntax rule;

an inline assembly code syntax rule and an inline assembly code conversion rule corresponding to the inline assembly code syntax rule; and an intrinsic header file syntax rule and an intrinsic header file conversion rule corresponding to the intrinsic header file syntax rule;

converting the to-be-converted syntax block according to a conversion rule provided by the rule library to obtain a converted syntax block; and generating, based on the converted syntax block, second source code for running on a second platform having a second processor architecture, wherein the second processor architecture is different from the first processor architecture, and the second processor architecture is an ARM architecture.

2. The method according to claim 1, wherein the step of converting the to-be-converted syntax block according to the conversion rule comprises:

analyzing the to-be-converted syntax block to obtain a semantic condition of the to-be-converted syntax block;

selecting, from the rule library based on the semantic condition of the to-be-converted syntax block, a conversion rule that matches the semantic condition of the to-be-converted syntax block; and modifying the to-be-converted syntax block to generate the converted syntax block.

3. The method according to claim 1, wherein the to-be-converted syntax block in the syntax tree of the first source code comprises a built-in function syntax block, an inline assembly code syntax block, or an intrinsic header file syntax block.

4. The method according to claim 1, wherein the built-in function syntax rule comprises a first syntax structure of the built-in function syntax block, a name of a built-in function corresponding to the built-in function syntax block, and a first attribute of the built-in function, the first syntax structure indicates syntax composition of the built-in function syntax block, and the first attribute indicates that the built-in function is called by a user file;

wherein the step of analyzing the syntax tree of the first source code to identify the to-be-converted syntax block comprises:

identifying the built-in function syntax block based on the first syntax structure of the built-in function syntax block, the name of the built-in function corresponding to the built-in function syntax block, and the first attribute of the built-in function; and wherein the step of converting the to-be-converted syntax block comprises:

analyzing the built-in function syntax block to obtain a semantic condition of the built-in function syntax block;

selecting, from the rule library based on the semantic condition of the built-in function syntax block, a built-in function conversion rule that matches the semantic condition of the built-in function syntax block; and modifying the built-in function syntax block to obtain the converted syntax block.

5. The method according to claim 1, wherein the inline assembly code syntax rule comprises a second syntax structure of the inline assembly code syntax block and a second attribute of inline assembly code corresponding to the inline assembly code syntax block, the second syntax structure indicates syntax composition of the embedded assembly code syntax block, and the second attribute indicates that the inline assembly code is comprised in the user file;

wherein the step of analyzing the syntax tree of the first source code to identify the to-be-converted syntax block comprises:

identifying the inline assembly code syntax block based on the second syntax structure of the inline assembly code syntax block and the second attribute of the inline assembly code corresponding to the inline assembly code syntax block; and wherein the step of converting the to-be-converted syntax block comprises:

analyzing the inline assembly code syntax block to obtain a semantic condition of the inline assembly code syntax block;

selecting, from the rule library based on the semantic condition of the inline assembly code syntax block, an inline assembly code conversion rule that matches the semantic condition of the inline assembly code syntax block; and modifying the inline assembly code syntax block to generate the converted syntax block.

6. The method according to claim 1, wherein the intrinsic header file syntax rule comprises a third syntax structure of the intrinsic header file syntax block, and the third syntax structure indicates syntax composition of the intrinsic header file syntax block;

wherein the step of analyzing the syntax tree comprises:

identifying the intrinsic header file syntax block based on the third syntax structure of the intrinsic header file syntax block; and wherein the step of converting the to-be-converted syntax block to obtain the converted syntax block comprises:

analyzing the intrinsic header file syntax block to obtain a semantic condition of the intrinsic header file syntax block;

selecting, from the rule library based on the semantic condition of the intrinsic header file syntax block, an intrinsic header file conversion rule that matches the semantic condition of the intrinsic header file syntax block, and modifying the intrinsic header file syntax block to generate the converted syntax block.

7. The method according to claim 1, wherein the rule library further comprises a built-in function association rule and a built-in function association conversion rule corresponding to the built-in function association rule, the built-in function association rule comprises searching for a built-in function association syntax block associated with the built-in function syntax block, and wherein the step of converting the to-be-converted syntax block to obtain the converted syntax block comprises:

determining that the to-be-converted syntax block is the built-in function syntax block;

determining the built-in function association syntax block according to the built-in function association rule, wherein the built-in function association syntax block is a declaration of the built-in function or a definition of the built-in function;

selecting, from the rule library based on a semantic condition of the built-in function association syntax block, a built-in function association conversion rule that matches the semantic condition of the built-in function association syntax block; and modifying the built-in function association syntax block to generate the converted syntax block.

8. The method according to claim 1, wherein the rule library further comprises an inline assembly code association rule and an inline assembly code association conversion rule corresponding to the inline assembly code association rule, the inline assembly code association rule comprises searching for an inline assembly code association syntax block associated with the inline assembly code syntax block, and wherein the step of converting the to-be-converted syntax block to obtain the converted syntax block comprises:

determining that the to-be-converted syntax block is the inline assembly code syntax block;

determining the inline assembly code association syntax block according to the inline assembly code association rule, wherein the inline assembly code association syntax block is a definition of a variable or a declaration of a function in the inline assembly code;

selecting, from the rule library based on a semantic condition of the inline assembly code association syntax block, an inline assembly code association conversion rule that matches the semantic condition of the inline assembly code association syntax block; and modifying the inline assembly code association syntax block to generate the converted syntax block.

9. The method according to claim 4, wherein before generating the second source code, the method further comprises:

generating a semi-structured result file based on the to-be-converted syntax block and the converted syntax block, wherein the semi-structured result file comprises a location of the to-be-converted syntax block in the first source code and source code corresponding to the converted syntax block.

10. The method according to claim 9, further comprising:

receiving a modification made by a user to the semi-structured result file; and generating, based on a semi-structured result file obtained after the modification made by the user, the second source code for running on the second platform.

11. A cross-platform code conversion apparatus comprising:

a memory storing instructions, and at least one processor in communication with the memory, the at least one processor configured, upon execution of the instructions, to perform the following steps:

obtaining first source code configured for running on a first platform having a first processor architecture;

performing syntactic analysis on the first source code to generate a syntax tree of the first source code;

analyzing the syntax tree of the first source code according to a syntax rule provided by a rule library, and identifying a to-be-converted syntax block;

analyzing semantics of the to-be-migrated syntax block to obtain a constraint;

selecting a conversion rule from the rule library, based on the constraint, to convert the to-be-migrated syntax block, the rule library comprising:

a built-in function syntax rule and a built-in function conversion rule corresponding to the built-in function syntax rule;

an inline assembly code syntax rule and an inline assembly code conversion rule corresponding to the inline assembly code syntax rule; and an intrinsic header file syntax rule and an intrinsic header file conversion rule corresponding to the intrinsic header file syntax rule;

converting the to-be-converted syntax block according to a conversion rule provided by the rule library, to obtain a converted syntax block; and generating, based on the converted syntax block, second source code for running on a second platform having a second processor architecture, wherein the second processor architecture is different from the first processor architecture, and the second processor architecture is an ARM architecture.

12. The apparatus according to claim 11, wherein the operation of converting the to-be-converted syntax block comprise:

analyzing the to-be-converted syntax block to obtain a semantic condition of the to-be-converted syntax block;

selecting, from the rule library based on the semantic condition of the to-be-converted syntax block, a conversion rule that matches the semantic condition of the to-be-converted syntax block; and modifying the to-be-converted syntax block to generate the converted syntax block.

13. The apparatus according to claim 11, wherein the to-be-converted syntax block in the syntax tree of the first source code comprises a built-in function syntax block, an inline assembly code syntax block, or an intrinsic header file syntax block.

14. The apparatus according to claim 11, wherein the built-in function syntax rule comprises a first syntax structure of the built-in function syntax block, a name of a built-in function corresponding to the built-in function syntax block, and a first attribute of the built-in function, the first syntax structure indicates syntax composition of the built-in function syntax block, and the first attribute indicates that the built-in function is called by a user file; and wherein the operation of analyzing the syntax tree comprises:

identifying the built-in function syntax block based on the first syntax structure of the built-in function syntax block, the name of the built-in function corresponding to the built-in function syntax block, and the first attribute of the built-in function; and wherein the operation of converting the to-be-converted syntax box comprises:

analyzing the built-in function syntax block to obtain a semantic condition of the built-in function syntax block;

selecting, from the rule library based on the semantic condition of the built-in function syntax block, a built-in function conversion rule that matches the semantic condition of the built-in function syntax block; and modifying the built-in function syntax block to generate the converted syntax block.

15. The apparatus according to claim 11, wherein the inline assembly code syntax rule comprises a second syntax structure of the inline assembly code syntax block and a second attribute of inline assembly code corresponding to the inline assembly code syntax block, the second syntax structure indicates syntax composition of the inline assembly syntax block, and the second attribute indicates that the inline assembly code is comprised in the user file; and wherein the operation of analyzing the syntax tree comprises:

identifying the inline assembly code syntax block based on the second syntax structure of the inline assembly code syntax block and the second attribute of the inline assembly code corresponding to the inline assembly code syntax block; and wherein the operation of converting the to-be-converted syntax block comprises:

analyzing the inline assembly code syntax block to obtain a semantic condition of the inline assembly code syntax block;

selecting, from the rule library based on the semantic condition of the inline assembly code syntax block, an inline assembly code conversion rule that matches the semantic condition of the inline assembly code syntax block; and modifying the inline assembly code syntax block to generate the converted syntax block.

16. The apparatus according to claim 11, wherein the intrinsic header file syntax rule comprises a third syntax structure of the intrinsic header file syntax block, and the third syntax structure indicates syntax composition of the intrinsic header file syntax block; and wherein the operation of analyzing the syntax tree comprises:

identifying the intrinsic header file syntax block based on the third syntax structure of the intrinsic header file syntax block; and wherein the operation of converting the to-be-converted syntax block comprise:

analyzing the intrinsic header file syntax block to obtain a semantic condition of the intrinsic header file syntax block;

selecting, from the rule library based on the semantic condition of the intrinsic header file syntax block, an intrinsic header file conversion rule that matches the semantic condition of the intrinsic header file syntax block; and modifying the intrinsic header file syntax block, to generate the converted syntax block.

17. The apparatus according to a claim 11, wherein the rule library further comprises a built-in function association rule and a built-in function association conversion rule corresponding to the built-in function association rule, and the built-in function association rule comprises searching for a built-in function association syntax block associated with the built-in function syntax block; and wherein the operation of converting the to-be-converted syntax block comprise:

determining that the to-be-converted syntax block is the built-in function syntax block, and determining the built-in function association syntax block according to the built-in function association rule, wherein the built-in function association syntax block is a declaration of the built-in function or a definition of the built-in function;

selecting, from the rule library based on a semantic condition of the built-in function association syntax block, a built-in function association conversion rule that matches the semantic condition of the built-in function association syntax block; and modifying the built-in function association syntax block to generate the converted syntax block.

18. A non-transitory computer-readable media storing computer instructions that configure at least one processor, upon execution of the instructions, to perform the following steps:

obtaining first source code configured to run on a first platform having a first processor architecture;

performing syntactic analysis on the first source code to generate a syntax tree of the first source code;

analyzing the syntax tree of the first source code according to a syntax rule provided by a rule library, to identify a to-be-converted syntax block;

analyzing semantics of the to-be-migrated syntax block to obtain a constraint;

selecting a conversion rule from the rule library, based on the constraint, to convert the to-be-migrated syntax block, the rule library comprising:

a built-in function syntax rule and a built-in function conversion rule corresponding to the built-in function syntax rule;

an inline assembly code syntax rule and an inline assembly code conversion rule corresponding to the inline assembly code syntax rule; and an intrinsic header file syntax rule and an intrinsic header file conversion rule corresponding to the intrinsic header file syntax rule;

converting the to-be-converted syntax block according to a conversion rule provided by the rule library to obtain a converted syntax block; and generating, based on the converted syntax block, second source code for running on a second platform having a second processor architecture, wherein the second processor architecture is different from the first processor architecture, and the second processor architecture is an ARM architecture.

* * * * *